United States Patent
Tom et al.

(10) Patent No.: US 6,406,519 B1
(45) Date of Patent: Jun. 18, 2002

(54) GAS CABINET ASSEMBLY COMPRISING SORBENT-BASED GAS STORAGE AND DELIVERY SYSTEM

(75) Inventors: Glenn M. Tom, New Milford; James V. McManus, Danbury, both of CT (US)

(73) Assignee: Advanced Technology Materials, Inc., Danbury, CT (US)

( * ) Notice: Subject to any disclaimer, the term of this patent is extended or adjusted under 35 U.S.C. 154(b) by 0 days.

(21) Appl. No.: 09/564,323

(22) Filed: May 3, 2000

Related U.S. Application Data

(63) Continuation-in-part of application No. 09/082,596, filed on May 21, 1998, now Pat. No. 6,132,492, which is a continuation-in-part of application No. 08/809,019, filed on Mar. 27, 1998, now Pat. No. 5,935,305.

(51) Int. Cl.$^7$ .............................................. B01D 53/04
(52) U.S. Cl. ................ 95/95; 95/105; 95/133; 95/901; 95/902; 96/130; 96/143
(58) Field of Search .................... 95/46–55, 90–95, 95/133, 900–903, 96–106; 96/4, 108, 143, 144, 153, 130

(56) References Cited

U.S. PATENT DOCUMENTS

| | | | | |
|---|---|---|---|---|
| 240,423 A | * | 4/1881 | James ....................... | 206/7 X |
| 1,608,155 A | * | 11/1926 | Barnebey ................... | 206/7 X |
| 1,714,245 A | * | 5/1929 | Schaefer .................... | 96/146 X |
| 2,356,334 A | * | 8/1944 | Maude et al. ............... | 206/7 X |
| 2,450,289 A | * | 9/1948 | Marek ....................... | 96/146 X |
| 2,663,626 A | * | 12/1953 | Spangler .................... | 206/7 X |
| 2,987,139 A | * | 6/1961 | Bush .......................... | 95/133 |
| 2,997,371 A | * | 8/1961 | Wadsworth et al. ...... | 95/131 X |
| 3,006,153 A | * | 10/1961 | Cook ......................... | 206/7 X |
| 3,080,307 A | * | 3/1963 | Rinald ....................... | 96/127 X |
| 3,093,564 A | * | 6/1963 | Weisman et al. .......... | 96/127 X |
| 3,116,132 A | * | 12/1963 | Haller et al. ............... | 95/132 X |
| 3,144,200 A | * | 8/1964 | Taylor et al. .............. | 95/108 X |
| 3,264,803 A | * | 8/1966 | Read ......................... | 96/146 X |
| 3,287,432 A | * | 11/1966 | Sensel ........................ | 95/95 |
| 3,415,069 A | * | 12/1968 | Hauser ....................... | 96/126 X |
| 3,469,375 A | * | 9/1969 | Barrington et al. ........ | 96/146 X |

(List continued on next page.)

FOREIGN PATENT DOCUMENTS

| | | | | |
|---|---|---|---|---|
| DE | 1095796 | * | 12/1960 | ................... 95/133 |
| DE | 2264512 | * | 1/1974 | ................... 95/133 |
| DE | 3139781 | * | 4/1983 | ................... 96/122 |
| JP | 52-072373 | * | 6/1977 | ................... 96/130 |
| JP | 56-158126 | * | 12/1981 | ................... 96/130 |
| JP | 61-133116 | * | 6/1986 | ................... 96/126 |
| JP | 63-088017 | * | 4/1988 | ................... 96/121 |
| JP | 03-127606 | * | 5/1991 | ................... 96/108 |
| SU | 1181692 | * | 9/1985 | ................... 95/133 |
| SU | 1544475 | A1 * | 2/1990 | ................... 95/133 |
| SU | 1583151 | A1 * | 8/1990 | ................... 95/133 |

OTHER PUBLICATIONS

"Beaded Carbon UPS Solvent Recovery", *Chemical Engineering*, vol. 84, No. 18, pp. 39–40, Aug. 29, 1977 (copy in 96/126).*

*Primary Examiner*—Robert H. Spitzer
(74) *Attorney, Agent, or Firm*—Oliver A. Zitzmann; Steven J. Hultquist; Margaret Chappuis

(57) ABSTRACT

A gas supply system including a gas cabinet defining an enclosure including therein a gas dispensing manifold and one or more adsorbent-based gas storage and dispensing vessels mounted in the enclosure and joined in gas flow communication with the gas dispensing manifold. The enclosure may be maintained under low or negative pressure conditions for enhanced safety in the event of leakage of gas from the gas storage and dispensing vessel(s) in the enclosure. The gas supply system may be coupled to a gas-consuming unit in a semiconductor manufacturing facility, e.g., an ion implanter, an etch chamber, or a chemical vapor deposition reactor.

66 Claims, 9 Drawing Sheets

U.S. PATENT DOCUMENTS

| | | | | |
|---|---|---|---|---|
| 3,675,392 A | * | 7/1972 | Reighter | 95/96 |
| 3,713,273 A | * | 1/1973 | Coffee | 96/128 X |
| 3,719,026 A | * | 3/1973 | Sand | 95/106 |
| 3,788,036 A | * | 1/1974 | Lee et al. | 96/130 X |
| 4,023,701 A | * | 5/1977 | Dockery | 206/7 X |
| 4,263,018 A | * | 4/1981 | McCombs et al. | 96/130 X |
| 4,343,770 A | * | 8/1982 | Simons | 206/7 X |
| 4,378,982 A | * | 4/1983 | McCombs | 96/130 X |
| 4,417,005 A | * | 11/1983 | DeBievre et al. | 95/127 |
| 4,578,256 A | * | 3/1986 | Nishino et al. | 95/133 X |
| 4,723,967 A | * | 2/1988 | Tom | 96/108 X |
| 4,738,693 A | * | 4/1988 | Tom | 96/108 X |
| 4,738,694 A | * | 4/1988 | Godino et al. | 96/126 X |
| 4,749,384 A | * | 6/1988 | Nowobilski et al. | 96/108 X |
| 4,830,643 A | * | 5/1989 | Sassa et al. | 96/108 |
| 4,881,958 A | * | 11/1989 | Eckardt et al. | 96/127 |
| 5,051,117 A | * | 9/1991 | Prigge et al. | 95/95 |
| 5,089,244 A | * | 2/1992 | Parent et al. | 95/133 X |
| 5,112,367 A | * | 5/1992 | Hill | 96/130 X |
| 5,133,787 A | * | 7/1992 | Diot et al. | 96/121 |
| 5,151,395 A | * | 9/1992 | Tom | 502/67 |
| 5,202,096 A | * | 4/1993 | Jain | 96/126 X |
| 5,213,769 A | * | 5/1993 | Whitlock | 95/117 X |
| 5,238,469 A | * | 8/1993 | Briesacher et al. | 96/126 X |
| 5,409,526 A | * | 4/1995 | Zheng et al. | 96/132 |
| 5,417,742 A | * | 5/1995 | Tamhankar et al. | 95/96 |
| 5,429,662 A | * | 7/1995 | Fillet | 95/117 X |
| 5,512,087 A | * | 4/1996 | Varner et al. | 96/130 X |
| 5,518,528 A | | 5/1996 | Tom et al. | 95/103 |
| 5,676,735 A | | 10/1997 | McManus | 95/15 |
| 5,704,965 A | | 1/1998 | Tom et al. | 95/95 |
| 5,704,967 A | | 1/1998 | Tom et al. | 96/143 |
| 5,707,424 A | | 1/1998 | Tom et al. | 95/95 |
| 5,800,596 A | * | 9/1998 | Collin et al. | 96/108 X |
| 5,858,067 A | | 1/1999 | McManus | 95/109 |
| 5,935,305 A | | 8/1999 | Tom et al. | 96/143 |
| 6,132,492 A | * | 10/2000 | Hulquist et al. | 95/45 |

* cited by examiner

GAS CABINET ASSEMBLY COMPRISING SORBENT-BASED GAS STORAGE AND DELIVERY SYSTEM

CROSS-REFERENCE TO RELATED APPLICATIONS

This is a continuation-in-part of U.S. patent application Ser. No. 09/082,596, filed on May 21, 1998, now U.S. Pat. No. 6,132,492, which is a continuation-in-part of Ser. No. 08/809,019 filed Mar. 27, 1998 now U.S. Pat. No. 5,935,305 in the United States Patent and Trademark Office as a Designated/Elected Office (DO/EO/US) under the provisions of 35 USC 371, based on PCT international application no. PCT/US95/13040 filed on Oct. 13, 1995 designating the United States as a Designated State, and claiming the priority of U.S. patent application Ser. No. 08/322,224 filed Oct. 13, 1994 and issued May 21, 1996 as U.S. Pat. No. 5,518,528.

BACKGROUND OF THE INVENTION

1. Field of the Invention

This invention relates generally to storage and dispensing systems for the selective dispensing of gaseous reagents, e.g., hydride and halide gases, from a vessel or storage container in which the gas component(s) are held in sorptive relationship to a solid sorbent medium, and are desorptively released from the sorbent medium in the dispensing operation. The invention relates more specifically to gas cabinet assemblies containing one or more sorbent-based gas storage and dispensing vessels of such type, coupled to a gas dispensing manifold and/or other flow circuitry, to selectively dispense the gas from the vessel and gas cabinet to a downstream process unit, e.g., a semiconductor manufacturing facility.

2. Description of the Related Art

In the manufacture of semiconductor materials and devices, and in various other industrial processes and applications, there is a need for a reliable source of hydridic and halidic gases. Many of such gases, including for example silane, germane, ammonia, phosphine, arsine, diborane, stibine, hydrogen sulfide, hydrogen selenide, hydrogen telluride, and corresponding and other halide (chlorine, bromine, iodine, and fluorine) compounds, as a result of toxicity and safety considerations, must be carefully stored and handled in the industrial process facility.

The gaseous hydrides arsine ($AsH_3$) and phosphine ($PH_3$) are commonly used as sources of arsenic (As) and phosphorous (P) in ion implantation. Due to their extreme toxicity and high vapor pressure, their use, transportation and storage raise significant safety concerns for the semiconductor industry. Ion implantation systems typically use dilute mixtures of $AsH_3$ and $PH_3$ at pressures as high as 1500 psig. A catastrophic release of these high pressure cylinders could pose a serious injury potential and even death to fab workers.

Based on these considerations, the ion implant user must choose between solid or gas sources for arsenic and phosphorous species. Switching from As to P on an implanter with solid sources can take as long as 90 minutes. The same species change requires only 15 minutes with gas sources. However, arsine ($AsH_3$) and phosphine ($PH_3$), the two most commonly used source gases, are highly toxic. Their use has recently been the focus of widespread attention due to the safety aspects of handling and processing these gases. Many ion implantation systems utilize hydride gas sources supplied as dilute mixtures (10–15%), in either 0.44 L or 2.3 L cylinders at pressures of 400–1800 psig. It is the concern over the pressure-driven release of the gases from cylinders that has prompted users to investigate safer alternatives.

U.S. Pat. No. 4,744,221 issued May 17, 1988 to Karl O. Knollmueller discloses a method of storing and subsequently delivering arsine, by contacting arsine at a temperature of from about −30° C. to about +30° C. with a zeolite of pore size in the range of from about 5 to about 15 Angstroms to adsorb arsine on the zeolite, and then dispensing the arsine by heating the zeolite to an elevated temperature of up to about 175° C. for sufficient time to release the arsine from the zeolite material.

The method disclosed in the Knollmueller patent is disadvantageous in that it requires the provision of heating means for the zeolite material, which must be constructed and arranged to heat the zeolite to sufficient temperature to desorb the previously sorbed arsine from the zeolite in the desired quantity.

The use of a heating jacket or other means exterior to the vessel holding the arsine-bearing zeolite is problematic in that the vessel typically has a significant heat capacity, and therefore introduces a significant lag time to the dispensing operation. Further, heating of arsine causes it to decompose, resulting in the formation of hydrogen gas, which introduces an explosive hazard into the process system. Additionally, such thermally-mediated decomposition of arsine effects substantial increase in gas pressure in the process system, which may be extremely disadvantageous from the standpoint of system life and operating efficiency.

The provision of interiorly disposed heating coil or other heating elements in the zeolite bed itself is problematic since it is difficult with such means to uniformly heat the zeolite bed to achieve the desired uniformity of arsine gas release.

The use of heated carrier gas streams passed through the bed of zeolite in its containment vessel may overcome the foregoing deficiencies, but the temperatures necessary to achieve the heated carrier gas desorption of arsine may be undesirably high or otherwise unsuitable for the end use of the arsine gas, so that cooling or other treatment is required to condition the dispensed gas for ultimate use.

The present invention contemplates a gas storage and dispensing system, for the storage and dispensing of reagent gases, such as hydride and halide gases, which overcomes the above-discussed disadvantages of the method disclosed in the Knollmueller patent.

The system of the invention is adapted for storage and dispensing of a wide variety of reagent gases, including hydride and halide gases, and is selectively operable at ambient temperature levels, but is able to effectively utilize the high storage (sorptive) capacity of physical adsorbents such as zeolite materials.

SUMMARY OF THE INVENTION

The present invention relates to a gas supply system. The gas supply system includes a gas cabinet defining an enclosure including therein a gas dispensing manifold and one or more adsorbent-based gas storage and dispensing vessels mounted in the enclosure and joined in gas flow communication with the gas dispensing manifold.

The enclosure may be maintained under low or negative pressure conditions for enhanced safety in the event of leakage of gas from the gas storage and dispensing vessel(s) in the enclosure. The gas supply system may be coupled to a downstream gas-consuming unit, such as a process unit in a semiconductor manufacturing facility, e.g., an ion implanter, an etch chamber, a chemical vapor deposition reactor, etc.

The adsorbent-based gas storage and dispensing system constitutes an adsorption-desorption apparatus for storage and dispensing of a gas, e.g., a gas selected from the group consisting of hydride gases, halide gases, and organometallic reagent gases, such as Group V compounds. The adsorption-desorption apparatus comprises:

a storage and dispensing vessel constructed and arranged for holding a solid-phase physical sorbent medium, and for selectively flowing gas into and out of the vessel;

a solid-phase physical sorbent medium disposed in said storage and dispensing vessel at an interior gas pressure;

a sorbate gas physically adsorbed on said solid-phase physical sorbent medium;

a dispensing assembly coupled in gas flow communication with the storage and dispensing vessel, and constructed and arranged to provide, exteriorly of said storage and dispensing vessel, a pressure below said interior pressure, to effect desorption of sorbate gas from the solid-phase physical sorbent medium, and gas flow of desorbed gas through the dispensing assembly;

wherein the solid-phase physical sorbent medium is devoid of trace components selected from the group consisting of water, metals, and oxidic transition metal species (e.g., oxides, sulfites and/or nitrates) sufficient in concentration to decompose the sorbate gas in said storage and dispensing vessel.

In such apparatus, the solid-phase physical sorbent medium contains less than 350, preferably less than 100, more preferably less than 10, and most preferably less than 1, parts-per-million by weight of trace components selected from the group consisting of water and oxidic transition metal species, based on the weight of the physical sorbent medium.

In the apparatus of the invention, the solid-phase physical sorbent medium concentration of trace components selected from the group consisting of water and oxidic transition metal species, based on the weight of the physical sorbent medium, desirably is insufficient to decompose more than 5%, and preferably more than 1% by weight of the sorbate gas after 1 year at 25° C. and said interior pressure.

In another aspect, the present invention relates to an adsorption-desorption apparatus, for storage and dispensing of a gas, e.g., a gas selected from the group consisting of hydride gases, halide gases, and organometallic Group V compounds, said apparatus comprising:

a storage and dispensing vessel constructed and arranged for holding a solid-phase physical sorbent medium, and for selectively flowing gas into and out of said vessel;

a solid-phase physical sorbent medium disposed in said storage and dispensing vessel at an interior gas pressure;

a sorbate gas physically adsorbed on said solid-phase physical sorbent medium;

a dispensing assembly coupled in gas flow communication with the storage and dispensing vessel, and constructed and arranged to provide, exteriorly of said storage and dispensing vessel, a pressure below said interior pressure, to effect desorption of sorbate gas from the solid-phase physical sorbent medium, and gas flow of desorbed gas through the dispensing assembly;

wherein the solid-phase physical sorbent medium concentration of trace components selected from the group consisting of water, metals, and oxidic transition metal species, based on the weight of the physical sorbent medium, is insufficient to cause decomposition of the sorbate gas resulting in more than a 25%, and preferably more than a 10% rise in interior pressure after 1 week at 25° C. in said storage and dispensing vessel.

In such apparatus, the solid-phase physical sorbent medium desirably contains less than 350, preferably less than 100, more preferably less than 10, and most preferably less than 1, part(s)-per-million by weight of trace components selected from the group consisting of water and oxidic transition metal species, based on the weight of the physical sorbent medium.

Still another aspect of the invention relates to an adsorption-desorption apparatus, for storage and dispensing of boron trifluoride, such apparatus comprising:

a storage and dispensing vessel constructed and arranged for holding a solid-phase physical sorbent medium having a sorptive affinity for boron trifluoride, and for selectively flowing boron trifluoride into and out of said vessel;

a solid-phase physical sorbent medium having a sorptive affinity for boron trifluoride, disposed in said storage and dispensing vessel at an interior gas pressure;

boron trifluoride gas, physically adsorbed on said solid-phase physical sorbent medium; and a dispensing assembly coupled in gas flow communication with the storage and dispensing vessel, and constructed and arranged to provide, exteriorly of said storage and dispensing vessel, a pressure below said interior pressure, to effect desorption of boron trifluoride gas from the solid-phase physical sorbent medium, and gas flow of desorbed boron trifluoride gas through the dispensing assembly.

Although generally preferred to operate solely by pressure differential, in respect of the sorption and desorption of the gas to be subsequently dispensed, the system of the invention may in some instances advantageously employ a heater operatively arranged in relation to the storage and dispensing vessel for selective heating of the solid-phase physical sorbent medium, to effect thermally-enhanced desorption of the sorbate gas from the solid-phase physical sorbent medium.

A preferred solid-phase physical sorbent medium comprises a crystalline aluminosilicate composition, e.g., with a pore size in the range of from about 4 to about 13 Å, although crystalline aluminosilicate compositions having larger pores, e.g., so-called mesopore compositions with a pore size in the range of from about 20 to about 40 Å are also potentially usefully employed in the broad practice of the invention. Examples of such crystalline aluminosilicate compositions include 5 Å molecular sieve, and preferably a binderless molecular sieve. Although molecular sieve materials such as crystalline aluminosilicates and carbon molecular sieves are preferred in many instances, the solid-phase physical sorbent medium may usefully comprise other materials such as silica, alumina, macroreticulate polymers, kieselguhr, carbon, etc. The sorbent materials may be suitably processed or treated to ensure that they are devoid of trace components which deleteriously affect the performance of the gas storage and dispensing system. For example, carbon sorbents may be subjected to washing treatment, e.g., with hydrofluoric acid, to render them sufficiently free of trace components such as metals and oxidic transition metal species. Potentially useful carbon materials include so-called bead activated carbon of highly uniform spherical particle shape, e.g., BAC-MP, BAC-LP, and BAC- G-70R, available from Kureha Corporation of America, New York, N.Y.

The apparatus of the invention may be constructed with a solid-phase physical sorbent medium being present in the storage and dispensing vessel together with a chemisorbent material having a sorptive affinity for contaminants, e.g., decomposition products, of the sorbate gas therein. Such chemisorbent material may for example have a sorptive affinity for non-inert atmospheric gases. Examples of potentially suitable chemisorbent materials include a scavenger for such contaminants, such as a scavenger selected from the group consisting of:

(A) scavengers including a support having associated therewith, but not covalently bonded thereto, a compound which in the presence of such contaminant provides an anion which is reactive to effect the removal of such contaminant, said compound being selected from one or more members of the group consisting of:
  (i) carbanion source compounds whose corresponding protonated carbanion compounds have a pKa value of from about 22 to about 36; and
  (ii) anion source compounds formed by reaction of said carbanion source compounds with the sorbate gas; and
(B) scavengers comprising:
  (i) an inert support having a surface area in the range of from about 50 to about 1000 square meters per gram, and thermally stable up to at least about 250° C.; and
  (ii) an active scavenging species, present on the support at a concentration of from about 0.01 to about 1.0 moles per liter of support, and formed by the deposition on the support of a Group IA metal selected from sodium, potassium, rubidium, and cesium and their mixtures and alloys and pyrolysis thereof on said support.

By way of an example, such chemisorbent material may advantageously comprise a scavenger component selected from the group consisting of: trityllithium and potassium arsenide.

In respect of such chemisorbent materials for contaminants of the sorbate gas to be dispensed, any of a wide variety of scavengers or chemisorbent materials may be employed, including scavenger compositions of the types disclosed and claimed in U.S. Pat. No. 4,761,395 issued Aug. 2, 1988 to Glenn M. Tom, et al., and U.S. Pat. No. 5,385,686 issued Jan. 31, 1995 to Glenn M. Tom and James V. McManus, the disclosures of which hereby are incorporated herein by reference.

The chemisorbent material when employed may be utilized as a separate bed in gas communication with the bed of physical adsorbent, or alternatively the chemisorbent may be dispersed randomly or selectively throughout a bed of physical adsorbent material in the storage and dispensing vessel.

The invention in another aspect relates to an ion implantation system, comprising a reagent source for reagent source material and an ion implantation apparatus coupled in gas flow communication with such reagent source, and wherein the reagent source is of a type described hereinabove.

The present invention relates in still another aspect to a process for supplying a gas reagent selected from the group consisting of hydride gases, halide gases, and organometallic Group V compounds, such process comprising:

providing a storage and dispensing vessel containing a solid-phase physical sorbent medium having a physically sorptive affinity for said gas reagent;

physically sorptively loading on said solid-phase physical sorbent medium a sorbate gas selected from the group consisting of hydride gases and boron halide gases, to yield a sorbate gas-loaded physical sorbent medium; and desorbing sorbate gas from the sorbate gas-loaded physical sorbent medium, by reduced pressure desorption, for dispensing thereof;

wherein the solid-phase physical sorbent medium is devoid of trace components selected from the group consisting of water, metals and oxidic transition metal species in a sufficient concentration to decompose the sorbate gas in said storage and dispensing vessel.

In a further particular aspect, the invention relates to an adsorption-desorption process for storage and dispensing of boron trifluoride, comprising:

providing a storage and dispensing vessel containing a solid-phase physical sorbent medium having a physically sorptive affinity for boron trifluoride;

physically sorptively loading boron trifluoride on said solid-phase physical sorbent medium, to yield a boron trifluoride-loaded physical sorbent medium; and selectively desorbing boron trifluoride from the boron trifluoride-loaded physical sorbent medium, by reduced pressure desorption, for dispensing thereof.

Another apparatus aspect of the present invention relates to an adsorption-desorption apparatus, for storage and dispensing of a gas sorbable on a solid-phase physical sorbent medium, such apparatus comprising:

a storage and dispensing vessel constructed and arranged for holding a solid-phase physical sorbent medium, and for selectively flowing gas into and out of said vessel;

a solid-phase physical sorbent medium disposed in the storage and dispensing vessel at an interior gas pressure;

a sorbate gas physically adsorbed on the solid-phase physical sorbent medium;

a dispensing assembly coupled in gas flow communication with the storage and dispensing vessel, and constructed and arranged to provide, exteriorly of the storage and dispensing vessel, a pressure below said interior pressure, to effect desorption of sorbate gas from the solid-phase physical sorbent medium, and gas flow of desorbed gas through the dispensing assembly;

a cryopump coupled to the dispensing assembly for pressurizing the desorbed gas and discharging the resultingly pressurized gas.

In a further process aspect, the present invention relates to a process for storage and dispensing of a gas sorbable on a solid-phase physical sorbent medium, such process comprising:

providing a storage and dispensing vessel holding a solid-phase physical sorbent medium;

adsorbing such gas on the solid-phase physical sorbent medium;

establishing, exteriorly of the storage and dispensing vessel, a pressure below the interior pressure, to effect desorption of sorbate gas from the solid-phase physical sorbent medium, and flowing desorbed gas out of the storage and dispensing vessel;

cryopumping the desorbed gas from the storage and dispensing vessel to a predetermined pressure, wherein such predetermined pressure is higher than the pressure of the desorbed gas flowed out of the storage and dispensing vessel.

In all of the foregoing aspects, the gas storage and dispensing vessel of the invention may be deployed in a gas cabinet equipped with a gas dispensing manifold and associated flow circuitry therein, for dispensing of the gas desorbed from the sorbent material in the vessel and flowing the desorbed gas through the manifold flow circuitry and out of the cabinet to the gas-consumption unit. The gas storage and dispensing vessel and gas dispensing manifold may be associated with a pump, fan, blower, turbine, eductor, ejector, compressor, cryopump, or other motive flow means, to provide the pressure drop and extraction of the gas from the sorbent material in the vessel, for flow into the gas dispensing manifold.

Another aspect of the invention relates to a semiconductor manufacturing system, comprising a gas cabinet of the foregoing type, coupled to a semiconductor manufacturing process unit.

Other aspects, features and embodiments of the invention will be more fully apparent from the ensuing disclosure and appended claims.

DETAILED DESCRIPTION OF THE INVENTION AND PREFERRED EMBODIMENTS THEREOF

Figure 1:
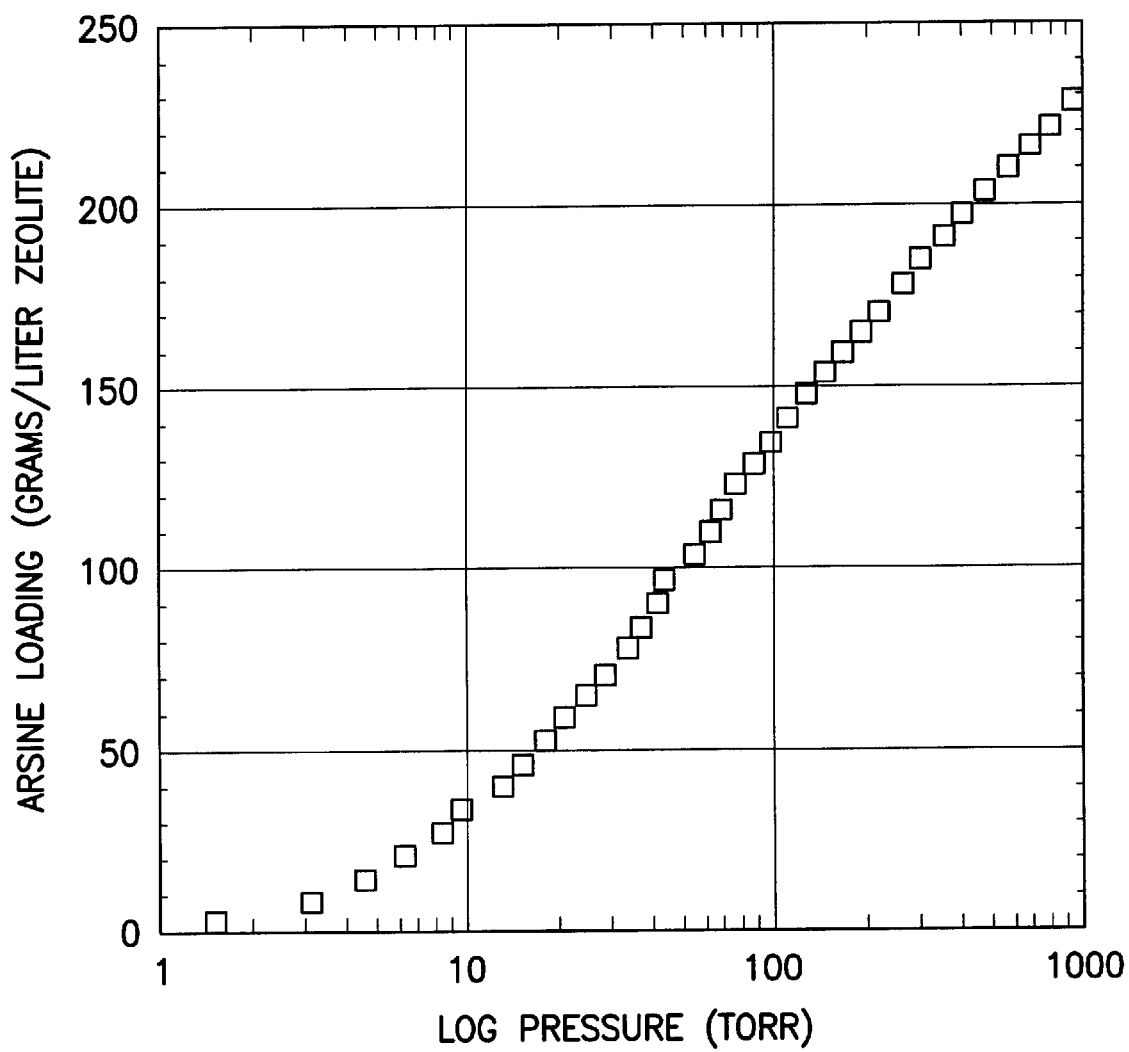
FIG. 1 shows a graph of the adsorption isotherm for arsine, as a plot of the arsine loading in grams arsine per liter of zeolite 5A, as a function of the log pressure in Torr.

The disclosures of the following patent applications and patents are hereby incorporated herein by reference in their entireties:

U.S. Pat. No. 5,935,305 issued Aug. 10, 1999;
PCT international application no. PCT/US95/13040 filed October 13, 1995];
U.S. Pat. No. 5,518,528 issued May 16, 1996;
U.S. Pat. No. 5,704,965 issued Jan. 6, 1998;
U.S. Pat. No. 5,704,967 issued Jan. 6, 1998;
U.S. Pat. No. 5,707,424 issued Jan. 13, 1998; and
U.S. Pat. No. 5,917,140 issued Jun. 29, 1999.

The present invent ion provides a gas cabinet assembly including a new atmospheric pressure storage and delivery system apparatus as a source gas supply means for applications such as ion implantation of hydride and halide gases, and organometallic Group V compounds, e.g., arsine, phosphine, chlorine, $NF_3$, $BF_3$, $BCl_3$, diborane ($B_2H_6$ and its deuterium analog, $B_2D_6$), HCl, HBr, HF, HI, tungsten hexafluoride, and $(CH_3)_3Sb$. The new gas source system is comprised of a leak-tight gas vessel, such as a gas cylinder, containing the gas to be dispensed, e.g., arsine or phosphine, adsorbed into a sorbent material comprising zeolite or other suitable physical adsorbent material. In the case of arsine and phosphine, the zeolite reduces the vapor pressure of the arsine and phosphine to 1 atmosphere.

Since the storage and delivery system is initially at atmospheric pressure, the release rate is controlled primarily by diffusion instead of a pressure differential. Inadvertent releases from the storage and delivery system have been measured and result in exposure concentrations to <½ IDLH. Release rate comparisons of the storage and delivery system to standard cylinders are more fully discussed hereinafter, and demonstrate that the storage and delivery system apparatus and method of the present invention is about $1\times10^5$ safer than compressed gas sources.

While the invention is discussed primarily hereinafter in terms of the storage and delivery of arsine and phosphine gases, it will be recognized that the utility of the present invention is not thus limited, but rather extends to and is inclusive of various other hydride and halide gases, as for example silane, diborane, arsine, phosphine, chlorine, $BCl_3$, $BF_3$, $B_2D_6$, tungsten hexafluoride, hydrogen fluoride, hydrogen chloride, hydrogen iodide, hydrogen bromide, germane, ammonia, stibine, hydrogen sulfide, hydrogen selenide, hydrogen telluride, and corresponding and other halide (chlorine, bromine, iodine, and fluorine) gaseous compounds such as $NF_3$, and organometallic compounds, e.g., Group V compounds such as $(CH_3)_3Sb$.

The novel means and method of the present invention for storing and delivering gaseous arsine and phosphine at 0 psig greatly reduces the hazard posed by these gases. The technique involves the adsorption of these gases into a physical adsorbent such as, for example, zeolite 5A. By adsorbing the gas into a zeolite or other suitable soild physical sorbent, the vapor pressure of the gas can be reduced to 0 psig. The release potential from this system is greatly reduced as the driving force of pressure is eliminated. Collectively, the storage and delivery system may usefully consist of a standard gas cylinder and cylinder valve, loaded with dehydrated zeolite 5A. The cylinder is subsequently filled to 1 atmosphere with the hydride gas. Although primarily disclosed hereinafter in reference to zeolites, the invention is broadly applicable to the usage of a wide variety of other physical sorbent materials, such as kieselguhr, silica, alumina, macroreticulate polymers (e.g., Amberlite resins, available from Rohm & Haas Company, Philadelphia, Pa.), carbon (e.g., bead activated carbon), etc.

Figure 2:
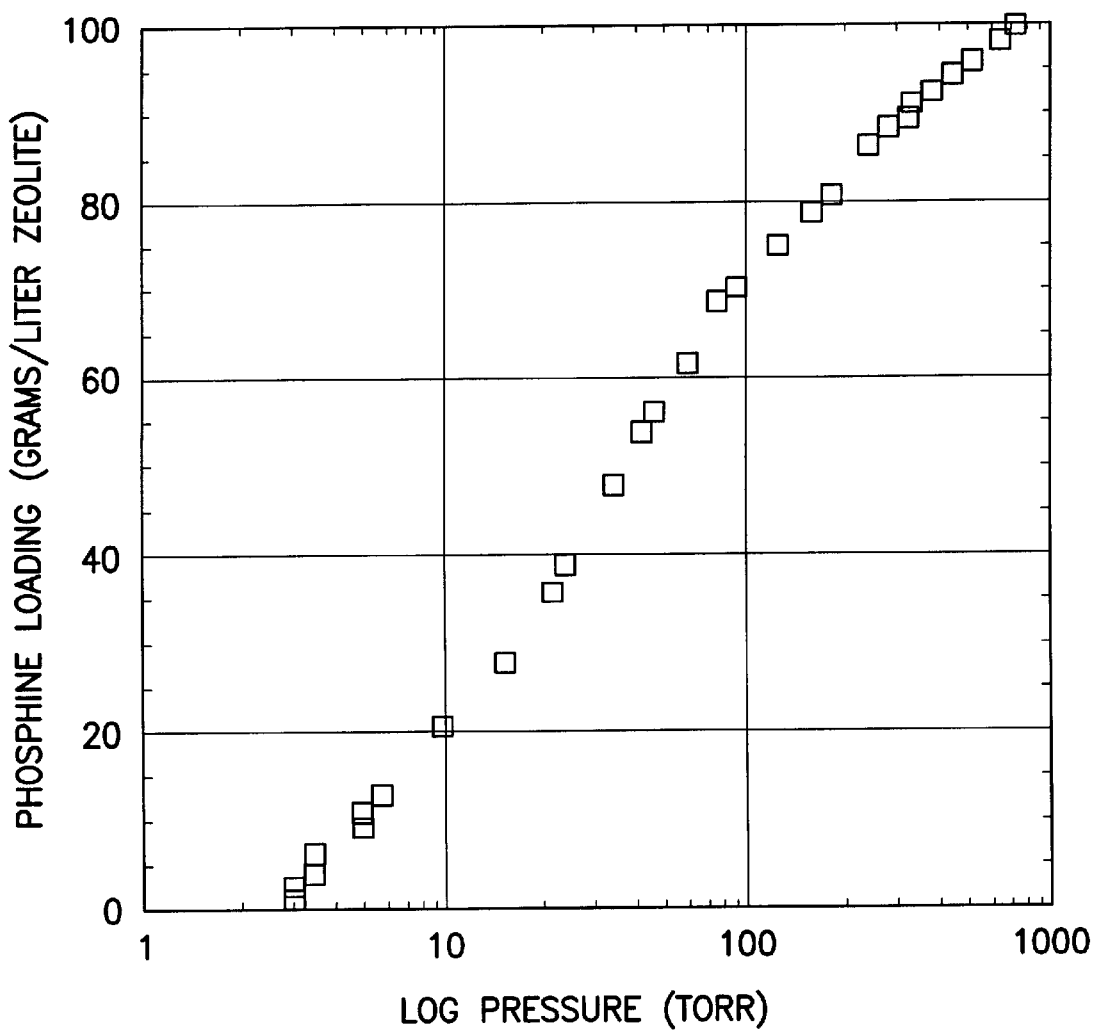
FIG. 2 shows a graph of the adsorption isotherm for arsine, as a plot of the arsine loading in grams phosphine per liter of zeolite 5A, as a function of the log pressure in Torr.

Zeolites are microporous crystalline aluminosilicates of alkali or alkaline earth elements represented by the following stoichiometry:

$$M_{x/n}[(AlO_2)_x(SiO_2)_y]zH_2O$$

where x and y are integers with y/x=to or greater than 1, n is the valence of the cation M and z is the number of water molecules in each unit cell. Zeolite 5A has ~2.5×10²¹ hydride adsorption sites per gram. A liter of zeolite will adsorb 100 grams of phosphine and 220 grams of arsine at 25° C. and 1 atmosphere. FIGS. 1 and 2 show the adsorption isotherms for arsine and phosphine, respectively.

These isotherms show vapor pressure as a function of adsorbed hydride for a 1 liter cylinder. The isotherms are useful in determining the amount of deliverable hydride gas. As seen from the isotherms, roughly 50% of the hydride is adsorbed between 50–760 Torr. This is the amount of hydride that can practically be delivered by the respective storage and delivery systems.

Gas flow from the storage and delivery system is established using the existing pressure differential between the storage and delivery system and the ion implant vacuum chamber or other downstream use locus. Utilizing a device such as a mass flow controller, a constant flow can be achieved as the sorbent container pressure decreases.

Figure 3:
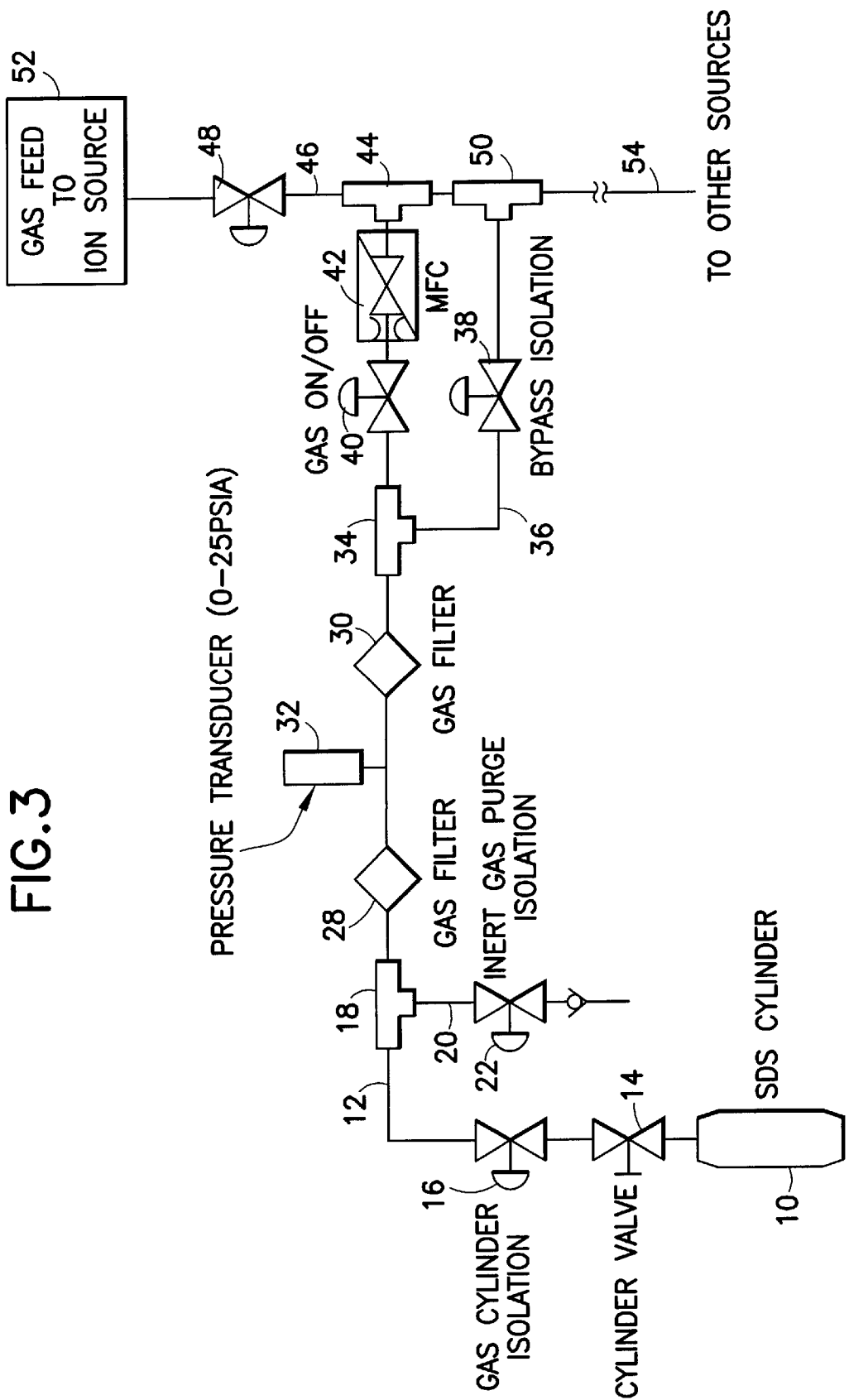
FIG. 3 is a schematic representation of a storage and delivery system according to one embodiment of the invention.

An appropriate delivery system for a zeolite storage system according to the invention is shown in FIG. 3.

In the schematic storage and delivery system shown in FIG. 3, a gas storage cylinder 10 is provided which may be filled with a bed of suitable physical adsorbent material, e.g., a zeolite sorbent or other suitable physical adsorbent medium of a type as more fully described hereinabove. The gas cylinder 10 is provided therein with the physical adsorbent bearing a physically adsorbed gas component, or components, such as arsine or phosphine.

The cylinder 10 is connected to a manifold 12, having disposed therein a cylinder valve 14 for controllably releasing gas from cylinder 10, upstream of a gas cylinder isolation valve 16, which may be selectively actuated to close cylinder 10 to communication with the manifold 12.

The manifold has a branch fitting 18 therein, by means of which the manifold 12 is coupled in gas flow communication with a branch purge line 20 having inert gas purge isolation valve 22 therein, whereby the manifold may be purged with inert gas, prior to active operation delivery of gas from cylinder 10.

Downstream from the fitting 18, the manifold contains two successive gas filters 28 and 30, intermediate of which is disposed a pressure transducer 32 which may, for example, have a pressure operating range of from about 0 to about 25 psia.

The manifold 12 is connected downstream of gas filter 30 with a branch fitting 34 to which is coupled a bypass conduit 36 having bypass isolation valve 38 therein.

The manifold 12 downstream of fitting 34 has a gas flow on-off valve 40 therein, downstream of which is disposed a mass flow controller 42 for controllably adjusting the flow rate of the hydride or halite gas dispensed through manifold 12. At its terminus downstream of mass flow controller 42, the manifold 12 is connected by coupling fitting 44 to dispensing line 46 filing flow control valve 48 therein, and also being coupled in gas flow communication with bypass line 36 via coupling fitting 50. The discharge line 46 is as shown joined to an ion source generating means, schematically shown as element 52. The other end 54 of discharge line 46 may be suitably coupled in gas flow communication with another gas dispensing means, as desirable or necessary in a given end use application of the FIG. 3 storage and delivery system apparatus.

Figure 4:
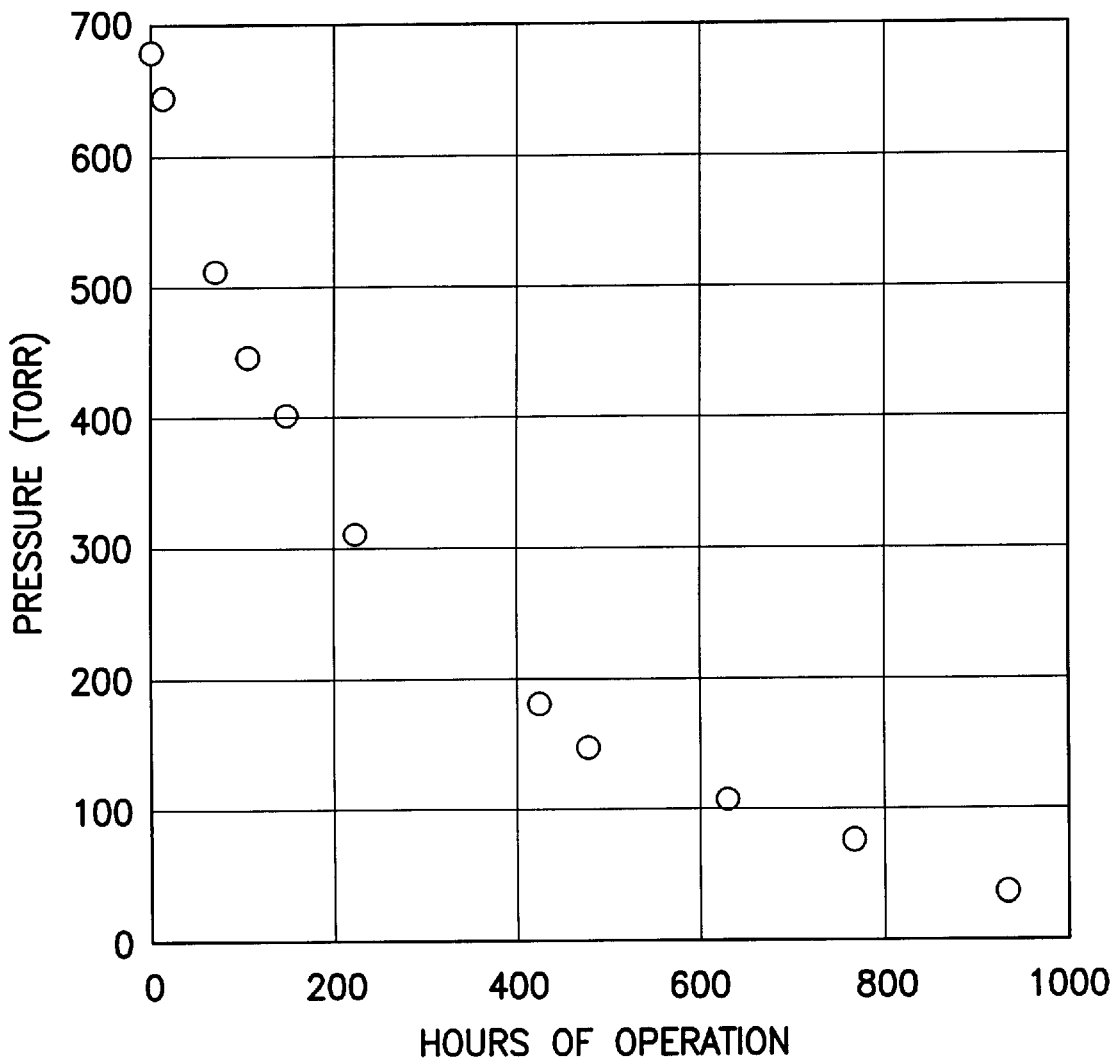
FIG. 4 is a delivery lifetime plot of arsine pressure, in Torr, as a function of hours of operation of the storage and delivery system apparatus.

FIG. 4 shows the delivery lifetime of a 4X molecular sieve (2.35 liters) in an arsine storage and delivery system apparatus to be ~1000 hr. at a flow rate of 1 sccm.

The lifetime test was conducted using a storage and delivery system apparatus similar to that schematically shown in FIG. 3.

In addition to the safety advantages, the zeolite storage technology of the present invention allows for a greater quantity of delivered gas. Table 1 below shows a comparison of delivered hydride from typical high pressure sources to that of the storage and delivery system.

TABLE 1

Delivery comparison of storage and delivery system cylinders to a standard high pressure cylinder (grams delivered)

| Gas | 400 PSIG 15% 440 ml storage/delivery system | 2.3 Liter storage/delivery system |
|---|---|---|
| Arsine 6 | 40 | 225 |
| Phosphine 3 | 18 | 105 |

Since approximately 5–20 times as much hydride is delivered by the storage and delivery system than by standard cylinders, fewer cylinder changes are required, thereby yielding enhanced productivity of the implant tool. Additionally, since most accidents with gases occur during cylinder changes, safety is further improved.

Since the storage and delivery system operates in the sub-atmospheric regime, the safety aspects related to an accidental incursion of air into a phosphine storage and delivery system cylinder was investigated. Phosphine spontaneously reacts with air as shown in the following equation:

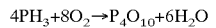

$$4PH_3 + 8O_2 \rightarrow P_4O_{10} + 6H_2O$$

$H_f$ of $P_4O_{10}$ = −720 Kcal/mole

Figure 5:
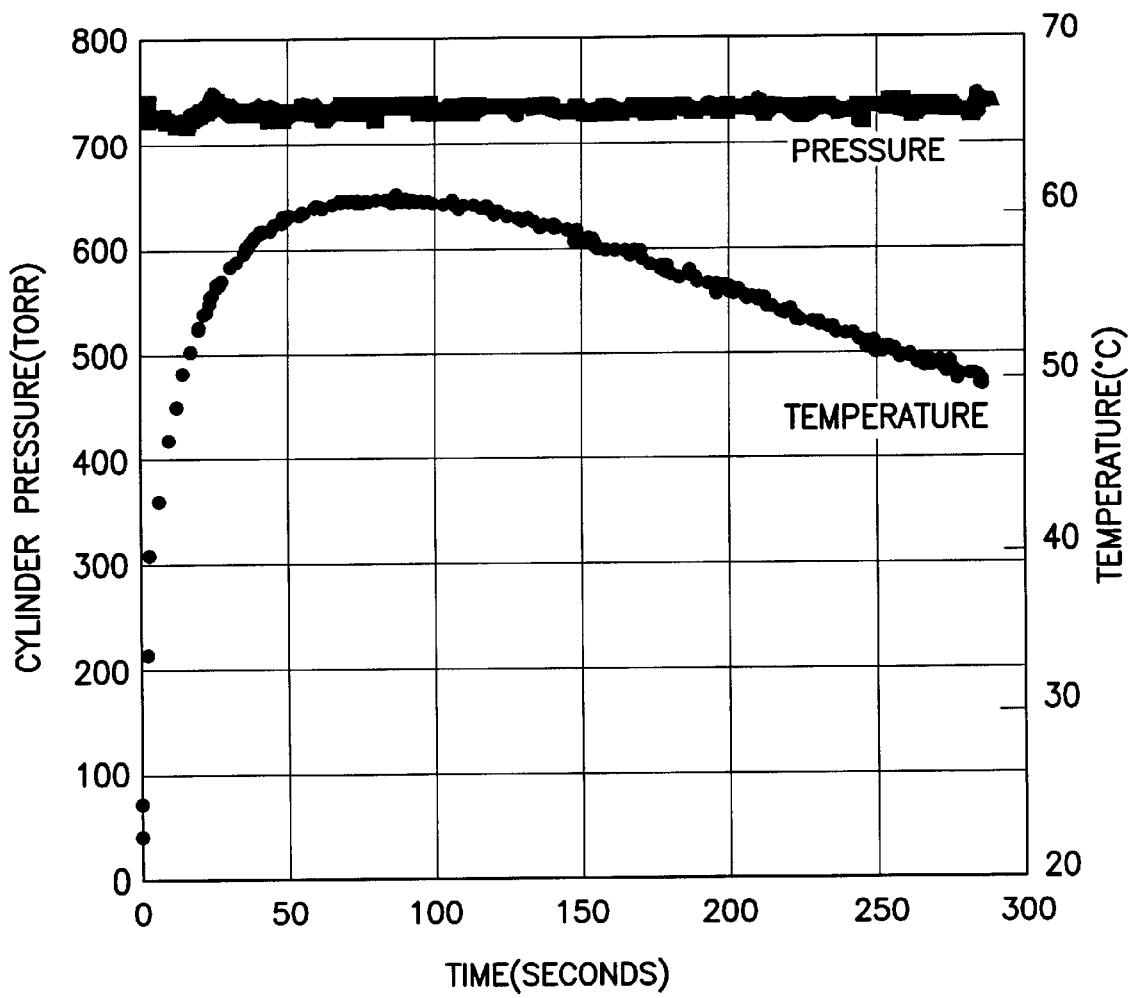
FIG. 5 is a plot of cylinder pressure, in Torr, as a function of time, in seconds, as well as a plot (on the right-hand y-axis) of temperature, in degrees Centigrade, as a function of time, in seconds, graphically showing the temperature and pressure rises during the experimental backfilling of a phosphine gas storage and delivery system apparatus, with room air.

A threshhold concern and intuitive expectation is that the excessive heat of reaction would cause a large pressure excursion or even a detonation in the cylinder. However, it has been determined that the event of ingressing air is of a manageable character since most of the resultingly generated heat will be adsorbed by the zeolite substrate. FIG. 5 shows the temperature and pressure rise during the experimental backfilling of a 0.5 liter phosphine storage and delivery system with room air, as a plot of cylinder pressure, in Torr, as a function of time, in seconds.

In the FIG. 5 system, the initial pressure of the phosphine storage and delivery system was 50 Torr. Upon backfilling, the reaction temperature was monitored with a thermocouple located inside the storage and delivery system cylinder. The reaction with air caused a temperature rise of 35° C. inside the cylinder. The cylinder pressure was measured using a capacitance pressure transducer. The maximum pressure recorded was ~800 Torr. The pressure rise above 1 atmosphere is a result of the increased bed temperature. The experimental data left us to conclude that the air backfill of a partially used phosphine storage and delivery system is not a significant safety hazard. The arsine case was not investigated as arsine reacts slowly with air at room temperature.

Figure 6:
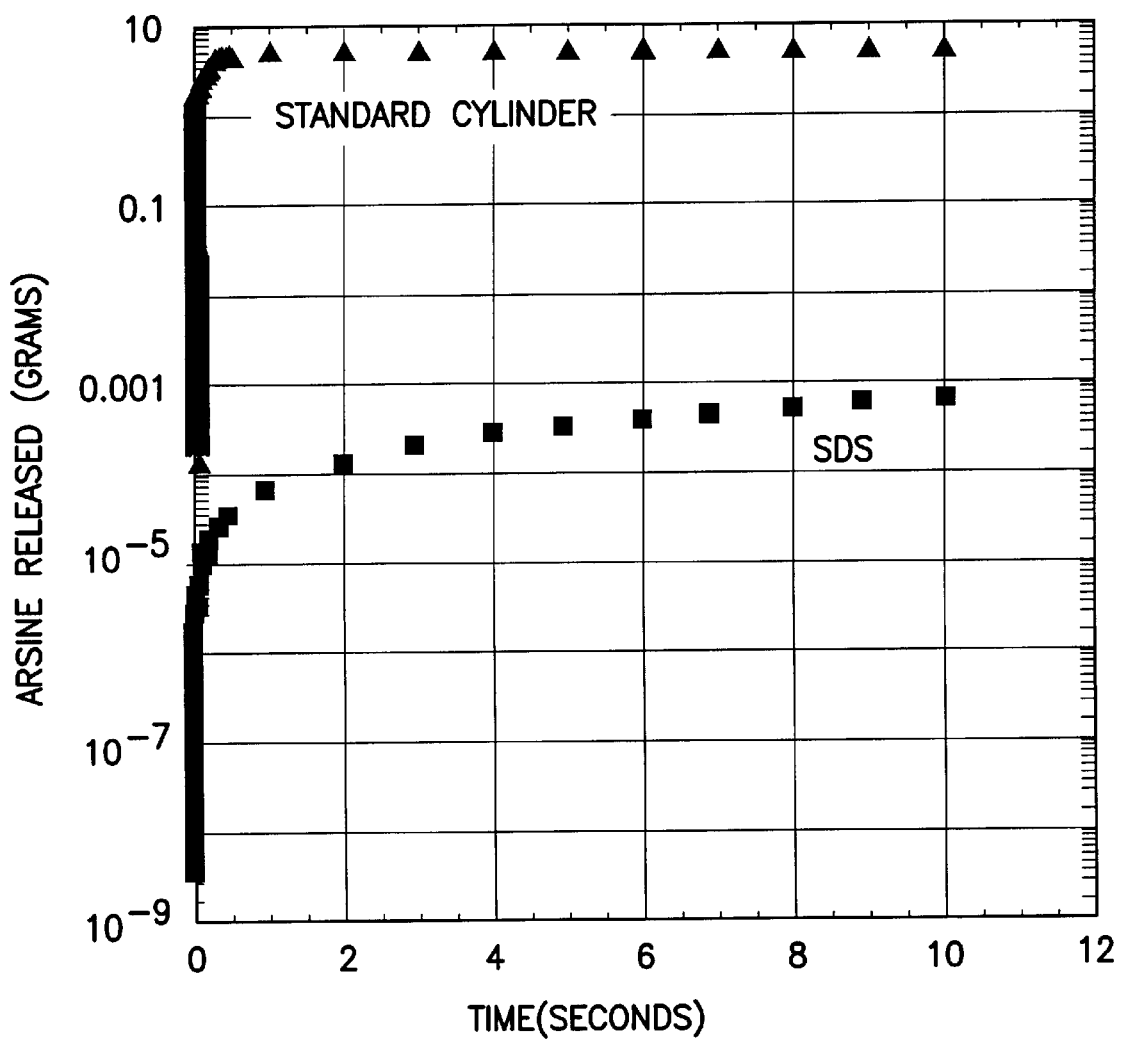
FIG. 6 is a plot of arsine released, in grams, as a function of time, in seconds, for a standard cylinder of arsine, versus an arsine storage and delivery system apparatus, in simulation of a worst case emission incident.

Hydride release was measured in a storage and delivery system apparatus of the type shown in FIG. 3 and described hereinabove. The emission rate of arsine from the storage and delivery system was measured and found to be 3.8 milligrams/minute. Although small, such rate was 3 orders of magnitude larger than that calculated from diffusion equations. It is suspected that the apparatus used in this experiment gave an erroneously high emission rate due to an eduction effect. Nonetheless, this experiment gives a worst case emission rate that is still $10^{-5}$ times less than a standard high pressure cylinder. FIG. 6. shows the emission rate of a standard gas cylinder versus an arsine storage and delivery system.

The purity of the arsine and phosphine from the storage and delivery system of the instant invention is exceptional. The only significant impurity detected is $H_2$. The hydrogen levels are found to vary between 10–1000 ppm. Since $H_2$ is currently used as a diluent in high pressure cylinders its presence is non-problematic in terms of operational efficacy of the storage and delivery system apparatus and method. Gas chromatography and mass spectroscopy have been used to verify the purity of the hydride.

The storage and delivery system-delivered arsine and phosphine is fully compatible with the ion implantation process. Yield analyses of wafers from split lots have been shown to be identical for those implanted with As and P from the storage and delivery system compared with those implanted with As and P from standard sources.

The storage and delivery system apparatus and method of the invention thus provide a significantly safer alternative to the current use of high pressure gas cylinders for the storage and dispensing of hydride and halide gases. The invention provides the capability to transport, store and deliver hydrides from a cylinder or other vessel at zero psig. The invention is based on the discovery that hydride and halide gases can be physically adsorbed into the microcavities of suitable support materials such as zeolites, thereby significantly reducing the pressure of gas for storage and dispensing purposes.

With only low level heating of the sorbent material in the practice of the present invention, by so-called thermally assisted delivery, it is possible to augment the delivery rate of the desorbing gas, so that flow rates of up to 500 sccm and higher are readily achieveable. Nonetheless, high rates of gas delivery are achieved in the broad practice of the present invention with adiabatic operation (no supplemental input of heat or thermal energy to the sorbate-laden sorbent medium), solely by the pressure differential existing between the sorbent vessel and the reduced pressure of the semiconductor (or other industrial or manufacturing) process, such as ion implantation, molecular beam epitaxy, and chemical vapor deposition.

The apparatus of the present invention may be readily provided in a unitary apparatus form, as disposed in a gas cabinet containing a multiplicity, e.g., three, sorbent vessels, each manifolded together for selective delivery of sorbate gas from one or more of such vessels. The cabinet may further include therein independent thermocouples, or other temperature sensing/monitoring equipment and components for preventing overheating of the vessels and/or other internal components of the gas cabinet in use thereof.

The cabinet may additionally include a fusible link heater element for selective augmentive heating of the vessels and sorbent therein; a sprinkler system; an exhaust heat sensor; a toxic gas monitor which functions to shut down the apparatus when toxic gas is sensed; a scrubber or bulk sorption device; and redundant pressure and temperature control means. With such a storage and delivery system apparatus, delivery rates of gas of 500 sccm at 15 psig are readily attainable.

In the preferred practice of the invention, the solid-phase physical sorbent medium is devoid of trace components selected from the group consisting of water, metals, and oxidic transition metal species in a concentration which is insufficient to decompose the sorbate gas in said storage and dispensing vessel. A highly advantageous sorbent medium of such type is commercially available from Zeochem Company (Louisville, Ky.) as Zeochem Binderless 5A sorbent, which is a synthetic calcium aluminosilicate of the formula $(CaO.Na_2O).Al_2O_3.2SiO_2.xH_2O$.

In this respect, it is to be noted that the significant presence in the sorbent material of any water, metals, or transition metal oxides tends to promote undesirably high levels of decomposition of the sorbate gas. In molecular sieves and other materials which lack such "contaminants" the sorbate gas degradation levels, and corresponding pressure levels are maintained at correspondingly low values. Concerning molecular sieve materials most specifically, a large number of such sorbents invariably contain clay or other mineralic binders which contain the aforementioned decomposition promotors, which undesirably degrade the performance of the storage and delivery system apparatus and method.

By way of example, the above-mentioned binderless Zeochem material has no detectable metallic impurities, while other conventional molecular sieve materials, e.g., Linde 5A zeolite has a substantial amount of iron therein. In consequence, the binderless zeolite exhibits decomposition levels which are on the order of about 1–2% of arsine (in an arsine storage and delivery system apparatus containing such zeolite) per year, while the Linde 5A zeolite exhibits decomposition levels of arsine which are on the order of a few tenths of a percent of the arsine per day. With the binderless zeolite, pressure increases in the sorbent material-containing vessel are less than 5% per week, while the Linde 5A zeolite (containing binder metal components) exhibits pressure rises of 9 psig (60%) per day in a corresponding storage and delivery system apparatus.

The solid-phase physical sorbent medium in the preferred practice of the invention therefore contains less than 350 parts-per-million by weight of trace components selected from the group consisting of water and oxidic transition metal species, based on the weight of the physical sorbent medium, more preferably less than 100 parts-per-million by weight, still more preferably less than 10 parts-per-million, and most preferably no more than 1 part-per-million by weight of trace components selected from the group consisting of water and oxidic transition metal species, based on the weight of the physical sorbent medium.

Correspondingly, the solid-phase physical sorbent medium concentration of trace components selected from the group consisting of water and oxidic transition metal species (e.g., oxides, sulfites and nitrates), based on the weight of the physical sorbent medium, preferably is insufficient to decompose more than 5% by weight of the sorbate gas after 1 year at 25° C. and said interior pressure.

In some applications, it is desired to provide gases deriving from a storage and delivery system apparatus at a higher-than-discharge pressure from the storage and delivery system sorbent-containing vessel. In such instances, venturi pumps may be employed which raise the pressure of the supplied gas to a selected pressure level above that at the cylinder head (of the cylinder containing the sorbent binding the gas being dispensed). Although such venturi pumping arrangements yield the dispensed gas at the selected higher pressure level, such arrangements nonetheless entail dilution of the gas being dispensed with a carrier gas, since the carrier gas is entrained with the dispensed gas from the cylinder.

Such dilution effect represents a significant constraint on the overall process system, in instances where neat gas of high purity is desired from the storage and delivery system apparatus. Mechanical pumps may be used in place of venturi pumping means, but mechanical pumps entail the disadvantage of a significant number of moving parts, which can cause problems associated with the formation of particulates in the pump and/or entrainment of lubricants.

In such instances, where the gas supplied by the storage and delivery system apparatus is desired to be furnished at high pressure in a high purity, neat condition, the provision of a cryopumping assembly in the storage and delivery system apparatus may be advantageous.

Figure 7:
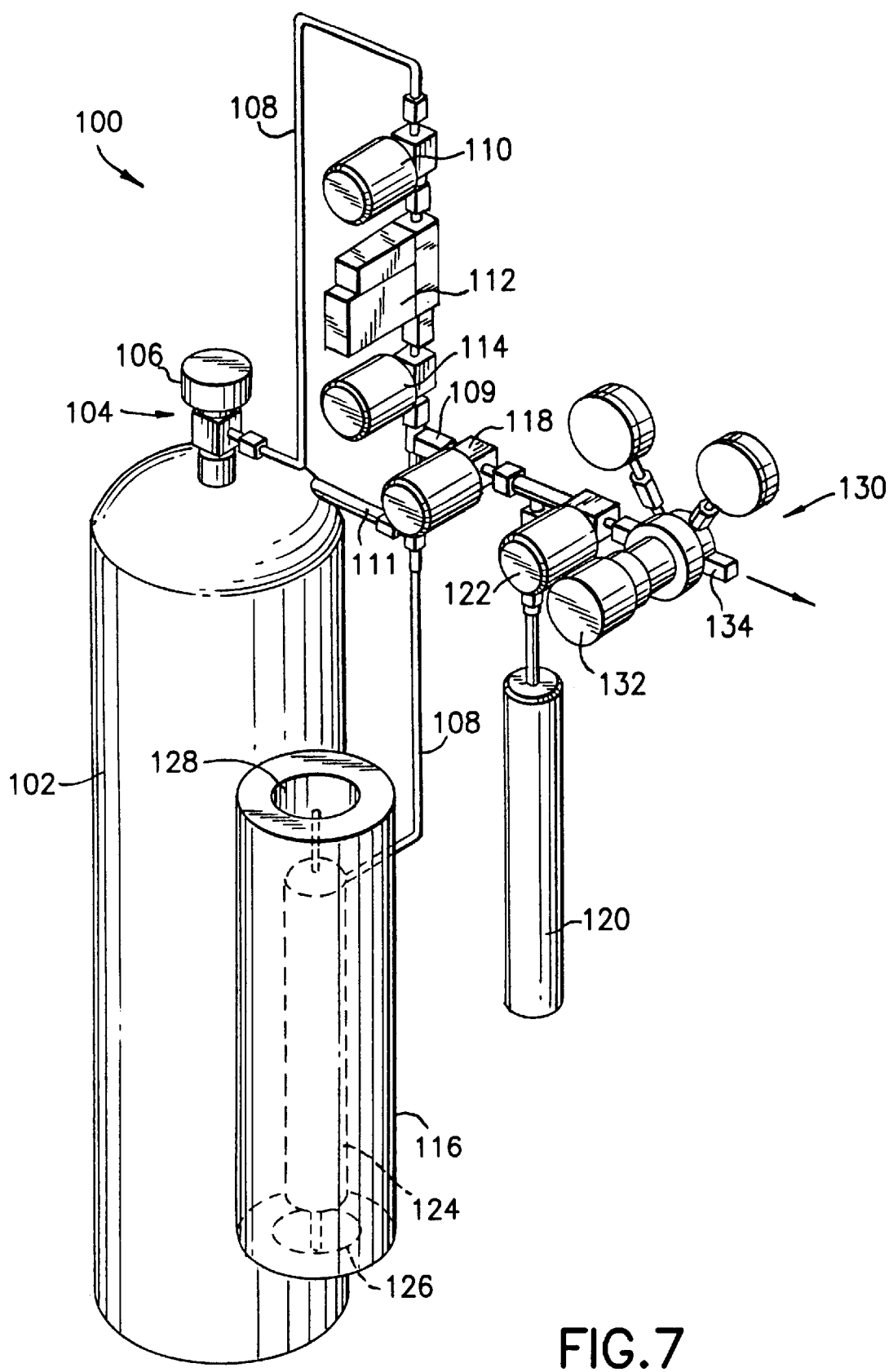
FIG. 7 is a schematic perspective view of a cryopumping storage and delivery system apparatus according to a further embodiment of the invention.

FIG. 7 is a schematic perspective view of such a cryopumping storage and delivery system apparatus 100, according to a further embodiment of the invention.

In the cryopumping system, the main cylinder 102 contains a suitable sorbent material (not shown), e.g., molecular sieve, having loaded thereon a suitable sorbate gas species to be subsequently dispensed, and is equipped with a valve head assembly 104 including main cylinder valve 106, which is in the ʟoff? position at the start of the dispensing process.

The valve head 104 is coupled to conduit 108 containing isolation valve 110, mass flow controller 112, isolation valve 114, and cryopump 116. Conduit 108 is in turn coupled to conduit 109 containing isolation valves 118 and 122 and product dispensing regulator assembly 130 having discharge port 134 coupleable to a downstream process system. Joined to the conduit 109 is a medium pressure storage vessel 120.

The cryopump 116 coupled to conduit 108 is provided with a liquid nitrogen (or other suitable cryogenic liquid or fluid) inlet 128 and a liquid nitrogen outlet 126, with a liquid cryogen flow path being provided intermediate the inlet 128 and the outlet 126 which is circumscribed by heating elements 124 as shown. The liquid cryogen inlet and outlet of the cryopump may be suitably joined to a source of liquid cryogen, as for example a cryogenic air separation installation or a cryogenic cylinder source of liquid nitrogen or other coolant. The cryopump thereby forms a cryotrap apparatus. The outlet of the cryopump thus is provided with an isolation valve 122, and the medium pressure cylinder 120 is isolatable by means of the isolation valve 122.

A pressure transducer 111 is provided in conduit 108 and is coupled in pressure monitoring relationship to cylinder 102 for monitoring of pressure in the cylinder and responsively adjusting the isolation valve 118.

The operation of the storage and delivery system shown schematically in FIG. 7 is illustrated below with reference to silane as the gas sorbed on the sorbent in cylinder 102 and to be delivered at suitable elevated pressure, and nitrogen as the cryogen to be employed as the working fluid in the cryopump 116. Silane has a boiling point of −111.5 degrees Centigrade and a melting point of 185 degrees Centigrade, and nitrogen has a boiling point of −195.8 degrees Centigrade.

Silane has been selected for illustration purposes since it is relatively difficult to deliver at suitably elevated pressure (in relation to other hydridic gases such as arsine which have higher boiling and freezing points, and thus may be more easily cryopumped with less cryogenic cooling being required).

If at the outset valves 110, 114, and 106 are open, with valves 118 and 122 being closed and under vacuum, and the temperature in the cryogenic pump is lowered to liquid nitrogen temperatures, silane will condense and freeze in the cryopump, even if relatively low internal pressures exist in the supply cylinder 102.

The mass flow controller 112 allows for accurate determination of the quantity of gas being transferred to the cryopump 116. Such accurate determination is important because overpressurization of the cryopump is desirably avoided. Under such operating conditions, silane will be above its critical temperature so that the ultimate pressure in the cryopump can potentially become very high.

After the correct amount of gas has been transferred to the cryopump 116, the valves 110 and 114 are closed. The condensed silane then is warmed to near ambient temperatures. The heating is carried out by the heating means 124, which in the embodiment shown comprise band heaters but could be any suitable heating means appropriate for such service. The silane gas does not thereby have to be heated to high temperatures, and the stability and purity of the product gas to be dispensed is thereby enhanced, since heating may result in the occurence of degradation of the silane gas with consequent adverse effect on its purity and further stability.

The pressure of the silane gas after the warm-up in the cryopump may become significantly elevated, and effectively the gas thereby has become compressed, in a high purity state, and without exposure to a mechanical pump with many moving parts which may otherwise result in contamination of the product gas.

The inventory of gases in the overall system may be quite low at this point, with most of the silane residing in the sorbent vessel, cylinder 102, at low pressure.

Opening valve 118 will then allow gas to flow into the medium pressure cylinder 120; if valve 122 is open, then product silane gas can flow to the downstream process through discharge port 134, as monitored by the monitoring means (e.g., flow pressure) associated with the regulator assembly 130. The regulator assembly 130 has associated pressure transducer 132 which may be operatively coupled in the overall system with the other valves and cryopump components so that the product gas is delivered at a selected pressure and volumetric flow rate.

Correspondingly, the various valves, mass flow controller, cryopump, transducers and regulator may be operatively interconnected in any suitable manner, e.g., with cycle timer, and process safety systems, to carry out the demand-based delivery of silane or other sorbate gases, in a readily controllable and reproducible manner.

Accordingly, the operation of the system schematically shown in FIG. 7 desirably is timed to avoid disruption to or interference with downstream process flows. Signals from the mass flow controller and pressure transducers in the cryopump and medium pressure tanks can be used in an automated process system. The cryopump can be cycled to move gases from the storage and delivery system to the medium pressure cylinder 120 to maintain a constant pressure at the outlet of the regulator.

EXAMPLE I

Decomposition of arsine gas in a storage and delivery cylinder was comparatively evaluated for each of two molecular sieve sorbent materials: Linde 5A molecular sieve (Union Carbide Corporation, Danbury, Conn.), hereinafter referred to as Sorbent A, and Zeochem 5A molecular sieve (Zeochem, Louisville, Ky.), hereinafter referred to as Sorbent B. Each of Sorbent A and Sorbent B are synthetic crystalline calcium aluminosilicates having 5 Angstrom pore size, but Sorbent A contains a clay binder whereas Sorbent B is binderless.

Set out in Table II below is a quantitative analysis of the Sorbent A and Sorbent B showing the differences in composition thereof, where the part-per-million (ppm) concentrations listed are ±50%.

TABLE II

Quantitative Analysis of Sorbent A and Sorbent B, in parts-per-million (ppm)

|  | Sorbent A | Sorbent B |
| --- | --- | --- |
| Aluminum | major[a] | major |
| Barium | <372 | <301 |
| Beryllium | <372 | <301 |
| Calcium | major | major |
| Cobalt | <372 | <301 |

TABLE II-continued

Quantitative Analysis of Sorbent A and Sorbent B,
in parts-per-million (ppm)

|  | Sorbent A | Sorbent B |
|---|---|---|
| Chromium | <372 | <301 |
| Copper | <372 | <301 |
| Iron | 3084 | <301 |
| Gallium | <372 | <301 |
| Magnesium | 556 | <301 |
| Manganese | <372 | <301 |
| Molybdenum | <372 | <301 |
| Nickel | <372 | <301 |
| Phosphorus | <372 | <301 |
| Lead | <372 | <301 |
| Silicon | major | major |
| Tin | <372 | <301 |
| Strontium | <372 | <301 |
| Titanium | <372 | <301 |
| Vanadium | <372 | <301 |
| Zinc | <372 | <301 |
| Zirconium | <372 | <301 |
| % Silicon | 21.19 | 19.70 |
| % Aluminum | 19.11 | 17.39 |
| % Calcium | 7.21 | 7.45 |

[a] major here referring to at least 5% by weight, based on the total weight of the molecular sieve As shown by the data in Table II, Sorbent B contained trace amounts (defined here as amounts of less than about 500 ppm of the specified component) of all measured elements with the exception of the major components of the molecular sieve, calcium, aluminum, and silicon, while Sorbent A contained a significant amount of iron (3084 ppm) and slightly more than a trace amount of magnesium.

In the comparison test of the two sorbent materials, each of identical gas cylinders was filled with a respective sieve material (Sorbent A in a first cylinder and Sorbent B in a second cylinder), and the sieve materials in each of the cylinders was loaded with a same amount of arsine gas. After the loading of the sieve materials in the respective cylinders, the pressures in each of the cylinders was monitored for pressure rise due to decomposition of arsine by the reaction As $\rightarrow$ As+1.5 $H_2$, since hydrogen is not adsorbed by the molecular sieves. Such monitoring took place at constant temperature.

Figure 8:
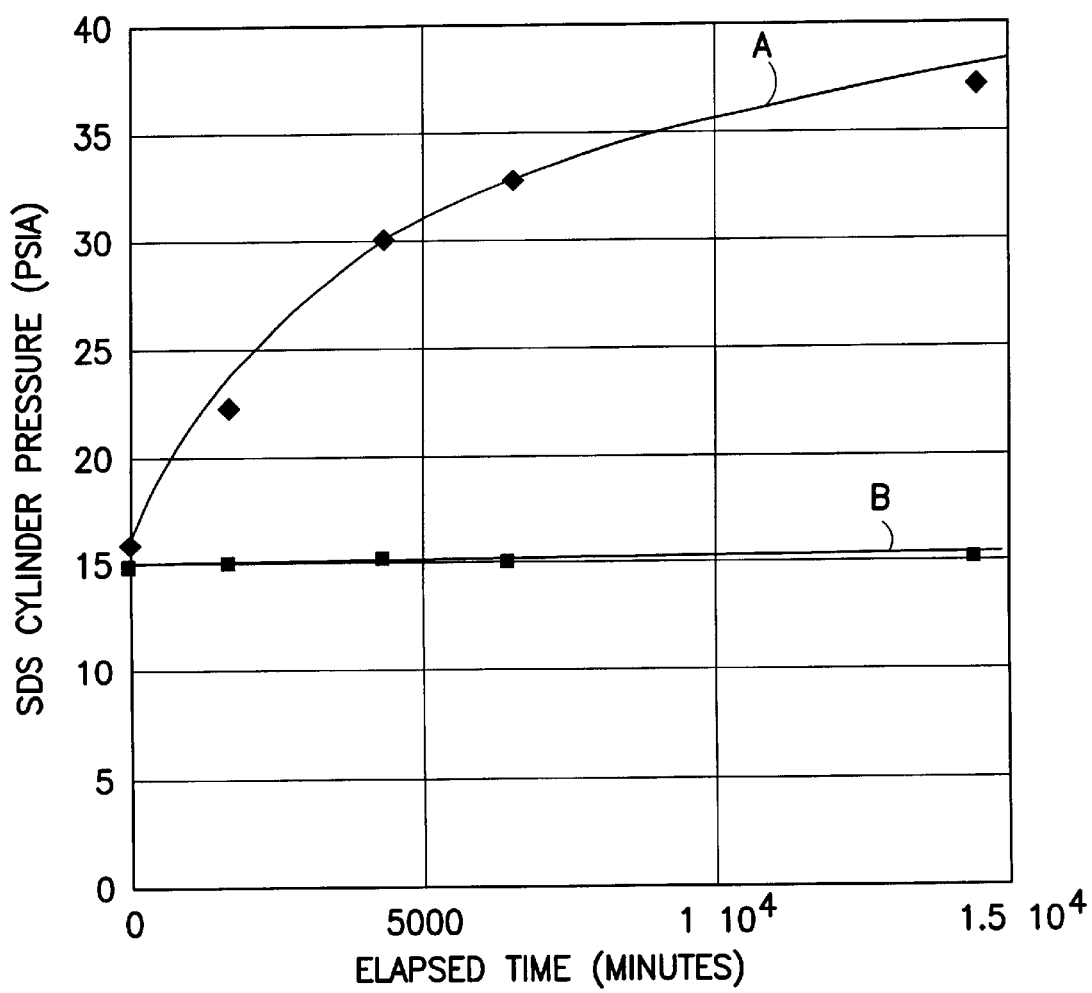
FIG. 8 is a graph of storage and delivery system cylinder pressure level, in psia, as a function of elaspsed time, in minutes, for two molecular sieve sorbent materials of differing iron content.

The resulting pressure history as a function of time is shown in the graph of FIG. 8, in which the pressure in psia is plotted as a function of elapsed time, in minutes. As shown by the Figure, curve A, showing the pressure behavior of the gas in the cylinder containing Sorbent A, after 250 hours rose to approximately 37.5 psia, while curve B, showing the pressure behavior of the gas in the cylinder containing Sorbent B, shows no pressure rise over the same period of time of the test.

The performance differences exhibited by the respective Sorbents A and B is striking, for the fact that while otherwise compositionally equivalent, the fact of the more-than-trace concentration of iron in Sorbent A led to substantially increased pressure due to the decomposition of arsine in the cylinder containing Sorbent A, while Sorbent B maintained the arsine in an undecomposed state, with no formation of hydrogen being observed in respect of pressure increase.

Accordingly, it is a significant discovery that the decomposition of hydridic gases such as arsine, phosphine, etc., can be suppressed by the provision of sorbent materials which are devoid of more than trace amounts of contaminants such as iron, which are conventionally present in commercially available molecular sieves and other sorbent materials comprising mineralic or clay-based binders, which have been incorporated in the sorbent composition for enhancing the structural stability and integrity of the sorbent material.

Figure 9:
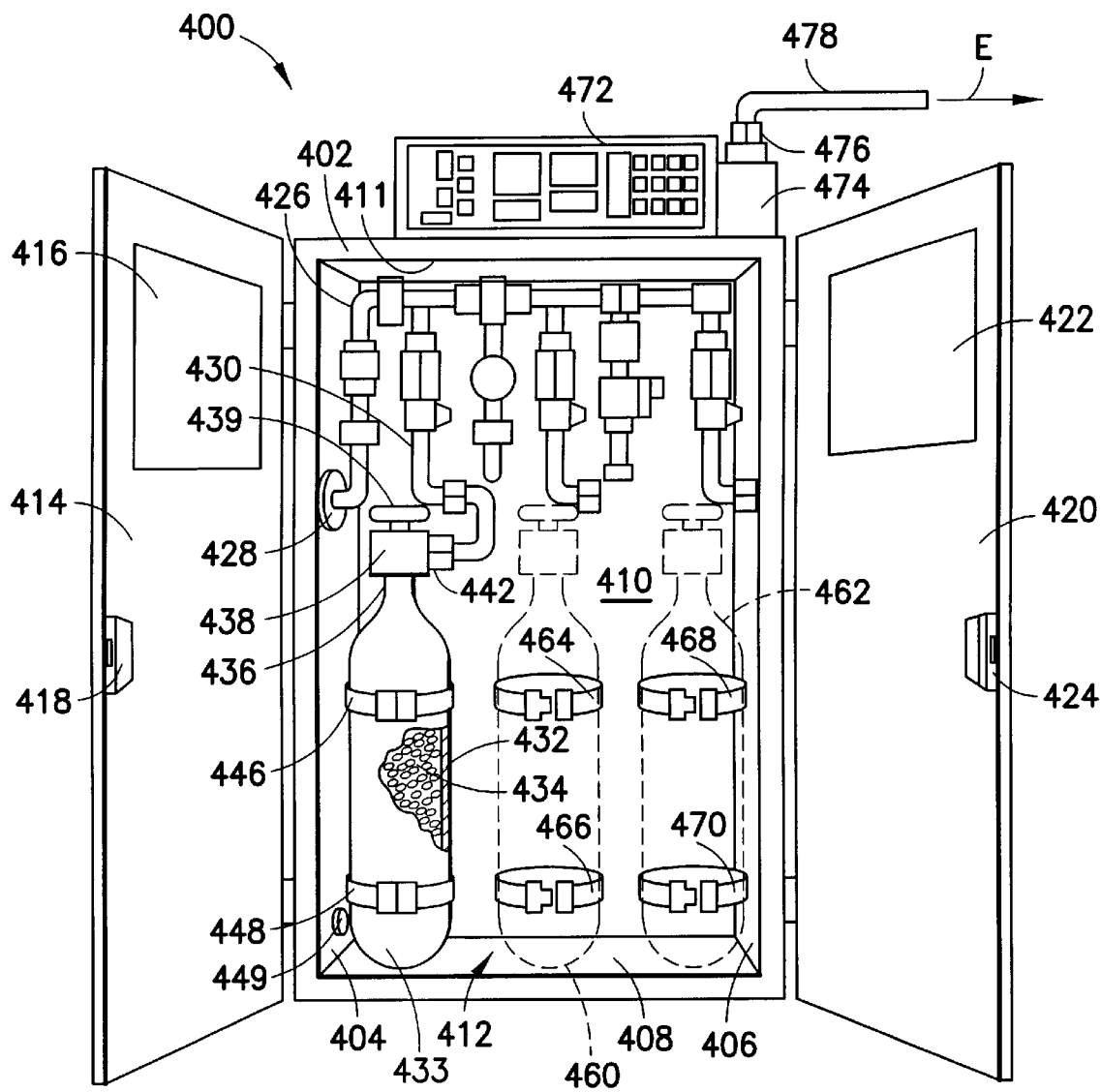
FIG. 9 is a frontal perspective view of a gas cabinet assembly incorporating a sorbent-based gas storage and dispensing assembly according to one embodiment of the invention.

FIG. 9 is a frontal perspective view of a gas cabinet assembly 400 incorporating a sorbent-based gas storage and dispensing assembly according to one embodiment of the invention.

The gas cabinet assembly 400 includes a gas cabinet 402. The gas cabinet 402 has side walls 404 and 406, floor 408, rear wall 410 and ceiling 411 defining a housing with front doors 414 and 420. The housing and respective doors enclose an interior volume 412.

The doors may be arranged to be self-closing and self-latching in character. For such purpose, the door 414 may have a latch element 418 that cooperatively engages lock element 424 on door 420. The doors 414 and 420 may be beveled and/or gasketed in such manner as to produce a gas-tight seal upon closure of the doors.

The doors 414 and 420 as shown may be equipped with windows 416 and 422, respectively. The windows may by wire-reinforced and/or tempered glass, so as to be resistant to breakage, while at the same time being of sufficient area to afford an unobstructed view of the interior volume 412 and manifold 426.

The manifold 426 as shown may be arrranged with an inlet connection line 430 that is joinable in closed flow communication with gas supply vessel 433.

The manifold 426 may comprise any suitable components, including for example flow control valves, mass flow controllers, process gas monitoring instrumentation for monitoring the process conditions of the gas being dispensed from the supply vessel, such as pressure, temperature, flow rate, concentration, and the like, manifold controls, including automated switching assemblies for switchover of the gas supply vessels when a multiplicity of such vessels is installed in the gas cabinet, leak detection devices, automated purge equipment and associated actuators for purging the interior volume of the gas cabinet when a leak is detected from one or more of the supply vessels.

The manifold 426 connects to an outlet 428 at the wall 404 of the cabinet, and the outlet 428 may in turn be connected to piping for conveying the gas dispensed from the supply vessel to a downstream gas-consumption unit coupled with the gas cabinet. The gas-consumption unit may for example comprise an ion implanter, chemical vapor deposition reactor, photolithography track, diffusion chamber, plasma generator, oxidation chamber, etc. The manifold 426 may be constructed and arranged for providing a predetermined flow rate of the dispensed gas from the supply vessel and gas cabinet to the gas-consumption unit.

The gas cabinet has a roof-mounted display 472 coupled with the manifold elements and ancillary elements in the interior volume of the cabinet, for monitoring the process of dispensing the gas from the gas supply vessel(s) in the interior volume of the cabinet.

The gas cabinet may also be provided with a roof-mounted exhaust fan 474 that is coupled by coupling fitting 476 to discharge conduit 478 for discharge of gas from the interior volume of the cabinet, in the direction indicated by arrow E. The exhaust fan 474 may be operated at appropriate rotational speed to impose a predetermined vacuum or negative pressure in the interior volume of the cabinet, as a further protective measure against any undesirable efflux of gas leakage from the gas cabinet. The discharge conduit may therefore be coupled to a downstream gas treatment unit (not shown), such as a scrubber or extraction unit for removing any leakage gas from the exhaust stream. In order to provide a supply of inflowing air for such purpose, the cabinet, e.g., the doors, may be constructed to allow a net inflow of ambient air as a sweep or purge stream for clearing the interior volume gas from the cabinet. Thus, the doors may be louvered, or otherwise be constructed for ingress of ambient gas.

The gas supply vessel 433 may suitably comprise a leak-tight gas container, such as for example a cylindrical container of the type used in conventional high pressure gas cylinders, including a wall 432 enclosing an interior volume of the vessel. Disposed in the interior volume of the container is a particulate solid sorbent medium, e.g., a physical adsorbent material such as carbon, molecular sieve, silica, alumina, etc. The sorbent may be of a type as described hereinabove, which has a high sorptive affinity and capacity for the gas to be dispensed.

For applications such as semiconductor manufacturing, in which dispensed reagent gases are preferably of ultra-high purity, e.g., "7–9's" purity, more preferably "9—9's" purity, and even higher, the sorbent material must be substantially free, and preferably essentially completely free, of any contaminant species that would cause decomposition of the stored gas in the vessel and cause the vessel interior pressure to rise to levels significantly above the desired set point storage pressure.

For example, it is typically desirable to utilize the sorbent-based storage and dispensing vessel of the invention to retain gas in the stored state at pressure not exceeding about atmospheric pressure, e.g., in the range of from about 25 to about 800 torr. Such atmospheric or below atmospheric pressure levels provide a level of safety and reliability that is lacking in the use of high pressure compressed gas cylinders.

For such high purity gas dispensing operation from the sorbent-based storage and dispensing system of the invention, it is desirable that the supply vessel be subjected to suitable preparative operations, such as vessel bake-out, and/or purging, to ensure that the vessel itself is free of contaminants that may outgas or otherwise adversely affect the gas dispensing operation in subsequent use of the sorbent-based storage and dispensing system. Further, the sorbent itself may be subjected to appropriate preparative operations, such as pretreatment to ensure desorption of all extraneous species from the adsorbent material, prior to being loaded in the supply vessel, or alternatively of being subjected to bake-out and/or purging after the adsorbent is charged to the vessel.

As shown in FIG. 9, the supply vessel 433 is of elongate vertically upstanding form, having a lower end that is reposed on the floor 408 of the cabinet, and with an upper neck portion 436 to which is secured a valve head 438 to leak-tightly seal the vessel. In its fabrication, the supply vessel 433 may be filled with adsorbent and thereafter, before or after the sorbate gas is loaded on the sorbent, the valve head 438 may be secured to the vessel neck portion, e.g., by welding, brazing, soldering, compressive joint fixturing with a suitable sealant material, etc., so that the vessel thereafter is leak-tight in character at the neck joint with the valve head.

The valve head 438 is provided with a coupling 442 for joining the vessel to suitable piping or other flow means permitting selective dispensing of gas from the vessel. The valve head may be provided with a hand wheel 439 for manually opening or closing the valve in the valve head, to flow or terminate the flow of gas into the connecting piping. Alternatively, the valve head may be provided with an automatic valve actuator that is linked to suitable flow control means, whereby the flow of gas during the dispensing operation is maintained at a desired level.

In operation, a pressure differential between the interior volume of the supply vessel 433 and the exterior piping/flow circuitry of the manifold is established to cause gas to desorb from the sorbent material and to flow from the vessel into the gas flow manifold 426. A concentration driving force for mass transfer is thereby created, by which gas desorbs from the sorbent and passes into the free gas volume of the vessel, to flow out of the vessel while the valve in the valve head is open.

Alternatively, the gas to be dispensed may be at least partially thermally desorbed from the sorbent in the vessel 433. For such purpose, the floor 408 of the cabinet may have an electrically actuatable resistance heating region on which the vessel is reposed, so that electrical actuation of the resistance heating region of the floor causes heat to be transferred to the vessel and the sorbent material therein. As a result of such heating, the stored gas desorbs from the sorbent in the vessel and may be subsequently dispensed.

The vessel may alternatively be heated for such purpose by deployment of a heating jacket or a heating blanket that enwraps or surrounds the vessel casing, so that the vessel and its contents are appropriately heated to effect the desorption of the stored gas, and subsequent dispensing thereof.

As a further approach, the desorption of the stored gas in the vessel may be carried out under the impetus of both pressure-differential-mediated desorption and thermally-mediated desorption.

As yet another alternative, the supply vessel may be provided with a carrier gas inlet port 449, which may be connected to a source of carrier gas (not shown) either interior or exterior to the cabinet. Such gas source may provide a flow of suitable gas, e.g., an inert gas or other gas that is non-deleterious to the process in the downstream gas-consumption unit. In such manner, gas may be flowed through the vessel to cause a concentration gradient to be developed that will effect desorption of the sorbate gas from the sorbent in the vessel. The carrier gas may therefore be a gas such as nitrogen, argon, krypton, xenon, helium, etc.

As shown in FIG. 9, the supply vessel 433 is held in place in the gas cabinet by strap fastners 446 and 448 of a conventional type. Other fasteners could be used, such as neck rings, or other securement structures may be employed, such as receiving depressions or cavities in the floor of the gas cabinet, that matably receive the lower end of the vessel therein, guide members or compartment structures that fixedly retain the vessel in a desired position in the interior volume of the gas cabinet.

Although only one vessel 433 is shown in the gas cabinet in FIG. 9, such gas cabinet is shown as being constructed and arranged to retain one, two or three vessels therein. In addition to the vessel 433, an optional second vessel 460 and an optional third vessel 462 are shown in dashed line representation in FIG. 9, being associated with the respective strap fasteners 464 and 466 (for optional vessel 460) and strap fasteners 468 and 470 (for optional vessel 462).

It will be apparent that the gas cabinet of the invention may be widely varied, to contain one or more than one vessel therein. In such manner, any number of gas supply vessels can be retained in a single unitary enclosure, thereby providing enhanced safety and process reliability in relation to use of conventional high pressure compressed gas cylinders.

In such manner, a multiplicity of sorbent-containing gas supply vessels may be provided, for sourcing of the various gas components needed in the downstream gas-consumption unit, or to provide multiple vessels each containing the same gas. The gases in multiple vessels in the gas cabinet may thus be the same as or different from one another, and the respective vessels may be concurrently operated to extract gas therefrom for the downstream gas-consumption unit, or the respective vessels may be operated by a cycle timer program and automated valve/manifold operation means, to successively open the vessels in turn to provide continuity of operation, or otherwise to accommodate the process requirements of the downstream gas-consumption unit.

The display 472 may be programmatically arranged with associated computer/microprocessor means to provide visual output indicative of the status of process operation, the volume of the dispensed gas flowed downstream, the remaining time or gas volume for the dispensing operation, etc. The display may be arranged to provide output indicating the time or frequency of maintenance events for the cabinet, or any other suitable information appropriate to the operation, use and maintenance of the gas cabinet assembly.

The display may also comprise audible alarm output means, signalling the need for changeout of the vessels in the gas cabinet, a leakage event, approach of cycle termination, or any event, state or process condition that is useful in the operation, use and maintenance of the gas cabinet.

It will therefore be appreciated that the gas cabinet assembly of the present invention may be widely varied in form and function, to provide a flexible means for sourcing reagent gas(es) to a downstream gas-consumption unit, such as a process unit in a semiconductor manufacturing facility.

The present invention therefore has utility in the manufacture of semiconductor materials and devices, and in other gas-consuming process operations, where it provides a reliable "on demand" source of gas, e.g., hydride gases, halide gases, and gaseous organometallic Group V compounds, including, for example, silane, diborane, germane, ammonia, phosphine, arsine, stibine, hydrogen sulfide, hydrogen selenide, hydrogen telluride, boron trifluoride, tungsten hexafluoride, chlorine, hydrogen chloride, hydrogen bromide, hydrogen iodide, and hydrogen fluoride.

By providing an economical and reliable source of such gases, in which the gas is safely held at relatively low pressure in the adsorbed state on a sorbent medium, and subsequently is easily dispensed to the point of use of the gas, the present invention avoids the hazards and gas handling problems associated with the use of conventional high pressure gas cylinders.

What is claimed is:

1. A process for supplying a gas reagent, comprising:
providing a storage and dispensing vessel containing a solid-phase physical sorbent medium having a physically sorptive affinity for said gas reagent;
physically sorptively loading on said solid-phase physical sorbent medium a sorbate gas, to yield a sorbate gas-loaded physical sorbent medium;
mounting the storage and dispensing vessel in a gas cabinet defining an enclosure including therein a gas dispensing manifold;
coupling the gas storage and dispensing vessel in gas flow communication with the gas dispensing manifold;
selectively desorbing sorbate gas from the sorbate gas-loaded physical sorbent medium, by reduced pressure desorption, for flow of desorbed sorbate gas into the gas dispensing manifold and dispensing thereof;
wherein the solid-phase physical sorbent medium is devoid of trace components selected from the group consisting of water. metals and oxidic transition metal species in a sufficient concentration to decompose the sorbate gas in said storage and dispensing vessel.

2. A process according to claim 1, wherein the solid-phase physical sorbent medium contains less than 350 parts-per-million by weight of trace components selected from the group consisting of water and oxidic transition metal species, based on the weight of the physical sorbent medium.

3. A process according to claim 1, wherein the solid-phase physical sorbent medium contains less than 100 parts-per-million by weight of trace components selected from the group consisting of water and oxidic transition metal species, based on the weight of the physical sorbent medium.

4. A process according to claim 1, wherein the solid-phase physical sorbent medium contains no more than 1 part-per-million by weight of trace components selected from the group consisting of water and oxidic transition metal species, based on the weight of the physical sorbent medium.

5. A process according to claim 1, wherein the solid-phase physical sorbent medium concentration of trace components selected from the group consisting of water and oxidic transition metal species, based on the weight of the physical sorbent medium, is insufficient to decompose more than 5% by weight of the sorbate gas after 1 year at 25° C. and said interior pressure.

6. A process according to claim 1, wherein the oxidic transition metal species are selected from the group consisting of oxides, sulfites and nitrates.

7. A process according to claim 1, wherein the sorbate gas is a hydride gas.

8. A process according to claim 1, wherein the sorbate gas is selected from the group consisting of silane, diborane, arsine, phosphine, chlorine, $BCl_3$, $BF_3$, $B_2D_6$, tungsten hexafluoride, $(CH_3)_3Sb$, hydrogen fluoride, hydrogen chloride, hydrogen iodide, hydrogen bromide, germane, ammonia, stibine, hydrogen sulfide, hydrogen selenide, hydrogen telluride, and $NF_3$.

9. A process according to claim 1, wherein the sorbate gas is boron trifluoride.

10. A process according to claim 1, further comprising selectively heating the solid-phase physical sorbent medium, to effect thermally-enhanced desorption of the sorbate gas from the solid-phase physical sorbent medium.

11. A process according to claim 1, wherein the solid-phase physical sorbent medium comprises a material selected from the group consisting of silica, carbon molecular sieves, alumina, macroreticulate polymers, kieselguhr, carbon, and aluminosilicates.

12. A process according to claim 11, wherein the crystalline aluminosilicate composition comprises a binderless molecular sieve.

13. A process according to claim 1, wherein the solid-phase physical sorbent medium comprises a crystalline aluminosilicate composition.

14. A process according to claim 13, wherein the crystalline aluminosilicate composition has pore size in the range of from about 4 to about 13 Angstroms.

15. A process according to claim 13, wherein the crystalline aluminosilicate composition comprises 5A molecular sieve.

16. A process according to claim 1, wherein the solid-phase physical sorbent medium is present in said storage and dispensing vessel with a chemisorbent material having a sorptive affinity for contaminants of said sorbate gas therein.

17. A process according to claim 16, wherein the chemisorbent material has a sorptive affinity for non-inert atmospheric gases.

18. A process according to claim 16, wherein the chemisorbent material comprises a scavenger selected from the group consisting of:
(A) a scavenger including a support having associated therewith, but not covalently bonded thereto, a compound which in the presence of said contaminant provides an anion which is reactive to effect the removal of said contaminant, said compound being selected from one or more members of the group consisting of:
   (i) carbanion source compounds whose corresponding protonated carbanion compounds have a pKa value of from about 22 to about 36; and
   (ii) anion source compounds formed by reaction of said carbanion source compounds with the sorbate gas; and
(B) a scavenger comprising:
   (i) an inert support having a surface area in the range of from about 50 to about 1000 square meters per gram, and thermally stable up to at least about 250° C.; and
   (ii) an active scavenging species, present on the support at a concentration of from about 0.01 to about 1.0 moles per liter of support, and formed by the deposition on the support of a Group IA metal selected from sodium, potassium, rubidium, and cesium and their mixtures and alloys and pyrolysis thereof on said support.

19. A process according to claim 16, wherein the chemisorbent material is selected from the group consisting of potassium arsenide and trityllithium.

20. A process according to claim 1, wherein the sorbate gas comprises an impurity component, and the solid-phase physical sorbent medium is provided in the storage and dispensing vessel together with an impurity scavenger for removal of the impurity component from the sorbate gas.

21. A process for supplying a gas reagent, comprising:
providing a storage and dispensing vessel containing a solid-phase physical sorbent medium having a physically sorptive affinity for said gas reagent;
physically sorptively- loading on said solid-phase physical sorbent medium a sorbate gas, to yield a sorbate gas-loaded physical sorbent medium;
mounting the storage and dispensing vessel in a gas cabinet defining an enclosure including therein a gas dispensing manifold;
coupling the gas storage and dispensing vessel in gas flow communication with the gas dispensing manifold; and
selectively desorbing sorbate gas from the sorbate gas-loaded physical sorbent medium, by reduced pressure desorption, for flow of desorbed sorbate gas into the gas dispensing manifold and dispensing thereof;
wherein the solid-phase physical sorbent medium concentration of trace components selected from the group consisting of water, metals, and oxidic transition metal species, based on the weight of the physical sorbent medium, is insufficient to cause decomposition of the sorbate gas resulting in more than a 25% rise in interior pressure after 1 week at 25° C. in said storage and dispensing vessel.

22. A process according to claim 21, wherein the solid-phase physical sorbent medium contains less than 350 parts-per-million by weight of trace components selected from the group consisting of water and oxidic transition metal species, based on the weight of the physical sorbent medium.

23. A process according to claim 21, wherein the solid-phase physical sorbent medium contains less than 100 parts-per-million by weight of trace components selected from the group consisting of water and oxidic transition metal species, based on the weight of the physical sorbent medium.

24. A process according to claim 21, wherein the solid-phase physical sorbent medium contains no more than 1 part-per-million by weight of trace components selected from the group consisting of water and oxidic transition metal species, based on the weight of the physical sorbent medium.

25. A process according to claim 21, wherein the solid-phase physical sorbent medium concentration of trace components selected from the group consisting of water and oxidic transition metal species, based on the weight of the physical sorbent medium, is insufficient to decompose more than 5% by weight of the sorbate gas after 1 year at 25° C. and said interior pressure, in said storage and dispensing vessel.

26. A process according to claim 21, wherein the oxidic transition metal species are selected from the group consisting of oxides, sulfites and nitrates.

27. A process according to claim 21, wherein the sorbate gas is a hydride gas.

28. A process according to claim 21, wherein the sorbate gas is selected from the group consisting of silane, diborane, arsine, phosphine, chlorine, $BCl_3$, $BF_3$, $B_2D_6$, tungsten hexafluoride, $(CH_3)_3Sb$, hydrogen fluoride, hydrogen chloride, hydrogen iodide, hydrogen bromide, ennane, ammonia, stibine, hydrogen sulfide, hydrogen selenide, hydrogen telluride, and $NF_3$.

29. A process according to claim 21, wherein the sorbate gas is boron trifluoride.

30. An adsorption-desorption process for storage and dispensing of boron trifluoride, said process comprising:
providing a storage and dispensing vessel containing a solid-phase physical sorbent medium having a physically sorptive affinity for boron trifluoride;
physically sorptively loading boron trifluoride on said solid-phase physical sorbent medium, to yield a boron trifluoride-loaded physical sorbent medium;
mounting the storage and dispensing vessel in a gas cabinet defining an enclosure including therein a gas dispensing manifold;
coupling the gas storage and dispensing vessel in gas flow communication with the gas dispensing manifold; and
selectively desorbing boron trifluoride from the boron trifluoride-loaded physical sorbent medium, by reduced pressure desorption, for flow of desorbed boron trifluoride gas into the gas dispensing manifold and dispensing thereof.

31. A process for supplying a gas reagent, comprising:
providing a storage and dispensing vessel containing a solid-phase physical sorbent medium having a physically sorptive affinity for said gas reagent;
physically sorptively loading on said solid-phase physical sorbent medium a sorbate gas, to yield a sorbate gas-loaded physical sorbent medium;
mounting the storage and dispensing vessel in a gas cabinet defining an enclosure including therein a gas dispensing manifold;

coupling the gas storage and dispensing vessel in gas flow communication with a cryopump;

coupling the cryopump in gas flow communication with the gas dispensing manifold;

selectively desorbing sorbate gas from the sorbate gas-loaded physical sorbent medium, by pressure-differential mediated desorption, for flow of desorbed sorbate gas to the cryopump; and cryopumping the desorbed gas from the storage and dispensing vessel to a predetermined pressure, wherein said predetermined pressure is higher than pressure of the desorbed gas flowed out of the storage and dispensing vessel.

32. A gas supply system comprising:

a gas cabinet defining an enclosure including therein a gas dispensing manifold and one or more adsorbent-based gas storage dispensing vessels mounted in the enclosure and joined in gas flow communication with the gas dispensing manifold, wherein each adsorbent-based gas storage and dispensing vessel in the enclosure comprises:

a storage and dispensing vessel constructed and arranged for holding a solid-phase physical sorbent medium, and for selectively flowing gas into and out of said vessel;

a solid-phase physical sorbent medium disposed in said storage and dispensing vessel at an interior gas pressure;

a sorbate gas physically adsorbed on said solid-phase physical sorbent medium;

the gas dispensing manifold being coupled in gas flow communication with the storage and dispensing vessel, and constructed and arranged to provide, exteriorly of said storage and dispensing vessel, a pressure below said interior pressure, to effect desorption of sorbate gas from the solid-phase physical sorbent medium, and gas flow of desorbed gas through the dispensing assembly;

wherein the solid-phase physical sorbent medium is devoid of trace components selected from the group consisting of water, metals, and oxidic transition metal species in a concentration which is sufficient to decompose the sorbate gas in said storage and dispensing vessel.

33. A gas supply system according to claim 32, wherein the solid-phase physical sorbent medium contains less than 350 parts-per-million by weight of trace components selected from the group consisting of water and oxidic transition metal species, based on the weight of the physical sorbent medium.

34. A gas supply system according to claim 32, wherein the solid-phase physical sorbent medium contains less than 100 parts-per-million by weight of trace components selected from the group consisting of water and oxidic transition metal species, based on the weight of the physical sorbent medium.

35. A gas supply system according to claim 32, wherein the solid-phase physical sorbent medium contains no more than 1 part-per-million by weight of trace components selected from the group consisting of water and oxidic transition metal species, based on the weight of the physical sorbent medium.

36. A gas supply system according to claim 32, wherein the solid-phase physical sorbent medium concentration of trace components selected from the group consisting of water and oxidic transition metal species, based on the weight of the physical sorbent medium, is insufficient to decompose more than 5% by weight of the sorbate gas after 1 year at 25° C. and said interior pressure.

37. A gas supply system according to claim 32, wherein the oxidic transition metal species are selected from the group consisting of oxides, sulfites and nitrates.

38. A gas supply system according to claim 32, wherein the sorbate gas is a hydride gas.

39. A gas supply system according to claim 32, wherein the sorbate gas is selected from the group consisting of silane, diborane, arsine, phosphine, chlorine, $BCl_3$, $BF_3$, $B_2D_6$, tungsten hexafluoride, $(CH_3)_3Sb$, hydrogen fluoride, hydrogen chloride, hydrogen iodide, hydrogen bromide, germane, ammonia, stibine, hydrogen sulfide, hydrogen selenide, hydrogen telluride, and $NF_3$.

40. A gas supply system according to claim 32, wherein the sorbate gas is boron trifluoride.

41. A gas supply system according to claim 32, further comprising a heater operatively arranged in relation to the storage and dispensing vessel for selective heating of the solid-phase physical sorbent medium, to effect thermally-enhanced desorption of the sorbate gas from the solid-phase physical sorbent medium.

42. A gas supply system according to claim 32, wherein the solid-phase physical sorbent medium comprises a material selected from the group consisting of silica, carbon, molecular sieves, alumina, macroreticulate polymers, kieselguhr, and aluminosilicates.

43. A gas supply system according to claim 32, wherein the solid-phase physical sorbent medium comprises a crystalline aluminosilicate composition.

44. A gas supply system according to claim 43, wherein the crystalline aluminosilicate composition has a pore size in the range of from about 4 to about 13 Angstroms.

45. A gas supply system according to claim 43, wherein the crystalline aluminosilicate composition comprises 5A molecular sieve.

46. A gas supply system according to claim 43, wherein the crystalline aluminosilicate composition comprises a binderless molecular sieve.

47. A gas supply system according to claim 32, wherein the solid-phase physical sorbent medium is present in said storage and dispensing vessel with a chemisorbent material having a sorptive affinity for contaminants of said sorbate gas therein.

48. A gas supply system according to claim 47, wherein the chemisorbent material has a sorptive affinity for non-inert atmospheric gases.

49. A gas supply system according to claim 47, wherein the chemisorbent material comprises a scavenger selected from the group consisting of:

(A) a scavenger including a support having associated therewith, but not covalently bonded thereto, a compound which in the presence of said contaminant provides an anion which is reactive to effect the removal of said contaminant, said compound being selected from one or more members of the group consisting of:
  (i) carbanion source compounds whose corresponding protonated carbanion compounds have a pKa value of from about 22 to about 36; and
  (ii) anion source compounds formed by reaction of said carbanion source compounds with the sorbate gas; and (B) a scavenger comprising:
  (i) an inert support having a surface area in the range of from about 50 to about 1000 square meters per gram, and thermally stable up to at least about 250° C.; and
  (ii) an active scavenging species, present on the support at a concentration of from about 0.01 to about 1.0 moles per liter of support, and formed by the deposition on the support of a Group IA metal selected from sodium, potassium, rubidium, and cesium and their mixtures and alloys and pyrolysis thereof on said support.

50. A gas supply system according to claim 47, wherein the chemisorbent material is selected from the group consisting of potassium arsenide and trityllithium.

51. A gas supply system comprising a gas cabinet defining an enclosure including therein a gas dispensing manifold and ore or more adsorbent-based gas storage and dispensing vessels mounted in the enclosure and joined in gas flow communication with the gas dispensing manifold, each said adsorbent-based storage and dispensing vessel comprising:
   a storage and dispensing vessel constructed and arranged for holding a solid-phase physical sorbent medium, and for selectively flowing gas into and out of said vessel;
   a solid-phase physical sorbent medium disposed in said storage and dispensing vessel at an interior gas pressure;
   a sorbate gas physically adsorbed on said solid-phase physical sorbent medium;
   the gas dispensing manifold being coupled in gas flow communication with the storage and dispensing vessel, and constructed and arranged to provide, exteriorly of said storage and dispensing vessel, a pressure below said interior pressure, to effect desorption of sorbate gas from the solid-phase physical sorbent medium, and gas flow of desorbed gas through the dispensing assembly;
   wherein the solid-phase physical sorbent medium concentration of trace components selected from the group consisting of water, metals, and oxidic transition metal species, based on the weight of the physical sorbent medium, is insufficient to cause decomposition of the sorbate gas resulting in more than a 5% rise in interior pressure after 1 week at 25° C. in said storage and dispensing vessel.

52. A gas supply system according to claim 51, wherein the solid-phase physical sorbent medium contains less than 350 parts-per-million by weight of trace components selected from the group consisting of water and oxidic transition metal species, based on the weight of the physical sorbent medium.

53. A gas supply system according to claim 51, wherein the solid-phase physical sorbent medium contains less than 100 parts-per-million by weight of trace components selected from the group consisting of water and oxidic transition metal species, based on the weight of the physical sorbent medium.

54. A gas supply system according to claim 51, wherein the solid-phase physical sorbent medium contains no more than 1 part-per-million by weight of trace components selected from the group consisting of water and oxidic transition metal species, based on the weight of the physical sorbent medium.

55. A gas supply system according to claim 51, wherein the solid-phase physical sorbent medium concentration of trace components selected from the group consisting of water and oxidic transition metal species, based on the weight of the physical sorbent medium, is insufficient to decompose more than 5% by weight of the sorbate gas after 1 year at 25° C. and said interior pressure, in said storage and dispensing vessel.

56. A gas supply system according to claim 51, wherein the oxidic transition metal species are selected from the group consisting of oxides, sulfites and nitrates.

57. A gas supply system according to claim 51, wherein the sorbate gas is a hydride gas.

58. A gas supply system according to claim 51, wherein the sorbate gas is selected from the group consisting of silane, diborane, arsine, phosphine, chlorine, $BCl_3$, $BF_3$, $B_2D_6$, tungsten hexafluoride, $(CH_3)_3Sb$, hydrogen fluoride, hydrogen chloride, hydrogen iodide, hydrogen bromide, germane, ammonia, stibine, hydrogen sulfide, hydrogen selenide, hydrogen telluride, and $NF_3$.

59. A gas supply system according to claim 51, wherein the sorbate gas is boron trifluoride.

60. A boron trifluoride gas supply system comprising a gas cabinet defining an enclosure including therein a gas dispensing manifold and one or more adsorbent-based gas storage and dispensing vessels mounted in the enclosure and joined in gas flow communication with the gas dispensing manifold, each said adsorbent-based storage and dispensing vessel comprising:
   a storage and dispensing vessel constructed and arranged for holding a solid-phase physical sorbent medium having a sorptive affinity for boron trifluoride, and for selectively flowing boron trifluoride into and out of said vessel;
   a solid-phase physical sorbent medium having a sorptive affinity for boron trifluoride, disposed in said storage and dispensing vessel at an interior gas pressure;
   boron trifluoride gas, physically adsorbed on said solid-phase physical sorbent medium; and
   the gas dispensing manifold coupled in gas flow communication with the storage and dispensing vessel, being constructed and arranged to provide, exteriorly of said storage and dispensing vessel, a pressure below said interior pressure, to effect desorption of boron trifluoride gas from the solid-phase physical sorbent medium, and gas flow of desorbed boron trifluoride gas through the gas dispensing manifold.

61. An ion implantation system, comprising a reagent source for reagent source material and an ion implantation apparatus coupled in gas flow communication with said reagent source, and wherein the reagent source comprises:
   a gas cabinet defining an enclosure including therein a gas dispensing manifold and one or more adsorbent-based gas storage and dispensing vessels mounted in the enclosure and joined in gas flow communication with the gas dispensing manifold, each said adsorbent-based storage and dispensing vessel comprising:
   a storage and dispensing vessel constructed and arranged for holding a solid-phase physical sorbent medium, and for selectively flowing gas into and out of said vessel;
   a solid-phase physical sorbent medium disposed in said storage and dispensing vessel at an interior gas pressure;
   a sorbate gas physically adsorbed on said solid-phase physical sorbent medium; and
   the gas dispensing manifold being at least a part of flow circuitry interconnecting the storage and dispensing vessel and said ion implantation apparatus in gas flow communication with one another, said flow circuitry being constructed and arranged to provide, exteriorly of said storage and dispensing vessel, a pressure below said interior pressure, to effect desorption of sorbate gas from the solid-phase physical sorbent medium, and gas flow of desorbed gas through the flow circuitry to the ion implantation apparatus;
   wherein the solid-phase physical sorbent medium is devoid of trace components selected from the group consisting of water, metals and oxidic transition metal species in a sufficient concentration to decompose the sorbate gas in said storage and dispensing vessel.

62. A gas supply system comprising a gas cabinet defining an enclosure including therein a gas dispensing manifold and one or more adsorbent-based gas storage and dispensing vessels mounted in the enclosure and joined in gas flow communication with the gas dispensing manifold, with a cryopump coupled to said gas dispensing manifold for pressurizing desorbed gas withdrawn from the adsorbent-based gas storage and dispensing vessels and discharging the resultingly pressurized gas.

63. A gas supply system comprising a gas cabinet defining an enclosure including therein a gas dispensing manifold and one or more adsorbent-based gas storage and dispensing vessels mounted in the enclosure and joined in gas flow communication with the gas dispensing manifold, comprising a thermal monitoring and control assembly for maintaining predetermined temperature characteristics of the gas supply system.

64. A gas supply system according to claim 63, further comprising: a heater element for selective augmentive heating of the vessels and sorbent therein; a sprinkler system arranged for operation for fire control in the cabinet; an exhaust heat sensor for monitoring temperature of gas exhausted from the cabinet; a toxic gas monitor for shutdown of the system when toxic gas is sensed; a scrubber for bulk sorption of gas leakage in the cabinet; and redundant pressure and temperature control means.

65. A semiconductor manufacturing facility, comprising:
   a gas supply system comprising a gas cabinet defining an enclosure including therein a gas dispensing manifold and one or more adsorbent-based gas storage and dispensing vessels mounted in the enclosure and joined in gas flow communication with the gas dispensing manifold; and
   a semiconductor manufacturing process unit arranged for use of gas from said gas supply system, and interconnected with the gas supply system by flow circuitry including said gas dispensing manifold for flow of gas from the gas supply system to the semiconductor manufacturing process unit.

66. A semiconductor manufacturing facility according to claim 65, wherein the semiconductor manufacturing process unit comprises a process unit selected from the group consisting of: chemical vapor deposition reactors; ion implanters; photolithography tracks; etch chambers; diffusion chambers; and plasma generators.

* * * * *